United States Patent
Yang et al.

(10) Patent No.: US 11,601,667 B2
(45) Date of Patent: Mar. 7, 2023

(54) INTER PREDICTION METHOD AND RELATED APPARATUS

(71) Applicant: HUAWEI TECHNOLOGIES CO., LTD., Guangdong (CN)

(72) Inventors: Haitao Yang, Shenzhen (CN); Fan Mu, Shenzhen (CN); Lian Zhang, Shenzhen (CN); Xiang Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/337,556

(22) Filed: Jun. 3, 2021

(65) Prior Publication Data

US 2021/0289224 A1    Sep. 16, 2021

Related U.S. Application Data

(63) Continuation of application No. PCT/CN2019/122458, filed on Dec. 2, 2019.

(30) Foreign Application Priority Data

Dec. 3, 2018  (CN) .......................... 201811467538.8

(51) Int. Cl.
*H04N 11/02* (2006.01)
*H04N 19/51* (2014.01)
(Continued)

(52) U.S. Cl.
CPC .......... *H04N 19/51* (2014.11); *H04N 19/172* (2014.11); *H04N 19/176* (2014.11); *H04N 19/184* (2014.11)

(58) Field of Classification Search
CPC ..................................................... H04N 19/51
(Continued)

(56) References Cited

U.S. PATENT DOCUMENTS

| | | | | |
|---|---|---|---|---|
| 2013/0287106 A1* | 10/2013 | Lee | ........................ | H04N 19/61 |
| | | | | 375/240.12 |
| 2015/0103911 A1* | 4/2015 | Lee | ...................... | H04N 19/577 |
| | | | | 375/240.15 |

(Continued)

FOREIGN PATENT DOCUMENTS

| | | |
|---|---|---|
| CN | 102934440 A | 2/2013 |
| CN | 103688543 A | 3/2014 |

(Continued)

OTHER PUBLICATIONS

ITU-T H.223 (Jul. 2001), "Series H: Audiovisual and Multimedia Systems, Infrastructure of audiovisual services—Transmission, multiplexing and synchronization, Multiplexing protocol for low bit rate multimedia communication," Jul. 2001, 74 pages.

(Continued)

*Primary Examiner* — Leron Beck
(74) *Attorney, Agent, or Firm* — Fish & Richardson P.C.

(57) ABSTRACT

This application provides an example inter prediction method and a related example apparatus. One example method includes parsing a bitstream to determine prediction information of a to-be-processed picture block, where the prediction information indicates that a prediction direction of the to-be-processed picture block is bidirectional prediction, where the bitstream does not include target identification information, and where the target identification information indicates to perform local illumination compensation (LIC) on the to-be-processed picture block; and obtaining a prediction value of the to-be-processed picture block based on the prediction information.

20 Claims, 7 Drawing Sheets

(51) Int. Cl.
*H04N 19/172* (2014.01)
*H04N 19/176* (2014.01)
*H04N 19/184* (2014.01)

(58) Field of Classification Search
USPC .................................... 375/240.01–240.29
See application file for complete search history.

(56) References Cited

U.S. PATENT DOCUMENTS

| | | |
|---|---|---|
| 2016/0366415 A1 | 12/2016 | Liu et al. |
| 2016/0366416 A1 | 12/2016 | Liu et al. |
| 2017/0347123 A1 | 11/2017 | Panusopone et al. |
| 2018/0063531 A1 | 3/2018 | Hu et al. |
| 2018/0241998 A1 | 8/2018 | Chen et al. |
| 2018/0310017 A1 | 10/2018 | Chen et al. |

FOREIGN PATENT DOCUMENTS

| | | |
|---|---|---|
| CN | 106454378 A | 2/2017 |
| CN | 106559669 A | 4/2017 |
| EP | 3308543 A1 | 4/2018 |
| KR | 100943913 B1 | 3/2010 |
| WO | 2016200779 A1 | 12/2016 |
| WO | 2018174618 A1 | 9/2018 |

OTHER PUBLICATIONS

ITU-T H.261 (Mar. 1993), "Line Transmission of Non-Telephone Signals, Video Codec for Audiovisual Services At p x 64 kbits," Mar. 19936, 29 pages.
ITU-T H.263 (Jan. 2005), :Series H: Audiovisual and Multimedia Systems, Infrastructure of audiovisual services—Coding of moving video, Video coding for low bit rate communication,: Jan. 2005, 226 pages.
ITU-T H.264 (Apr. 2017), "Series H: Audiovisual and Multimedia Systems, Infrastructure of audiovisual services—Coding of moving video, Advanced video coding for generic audiovisual services," Apr. 2017, 812 pages.
ITU-T H.265 (Feb. 2018), "Series H: Audiovisual and Multimedia Systems Infrastructure of audiovisual services—Coding of moving video, High efficiency video coding," total 692 pages.
Chen et al., "Algorithm Description of Joint Exploration Test Model 6 (JEM 6)," Joint Video Exploration Team (JVET) of ITU-T SG 16 WP 3 and ISO/IEC JTC 1/SC 29/WG 11, Document: JVET-F1001-v2, 6th Meeting: Hobart, AU, Mar. 31-Apr. 7, 2017, 50 pages.
PCT International Search Report and Written Opinion issued in International Application No. PCT/CN2019/122458 dated Mar. 6, 2020, 15 pages (with English translation).
Extended European Search Report issued in European Application No. 19892023.3 dated Mar. 10, 2022, 10 pages.
Seo et al., "Pixel Based Illumination Compensation," Joint Collaborative Team on Video Coding (JCT-VC) of ITU-T SG16 WP3 and ISO/IEC JTC1/SC29/WG11, Document JCTVC-F417, 6th Meeting, Toronto, Jul. 14-22, 2011, 8 pages.
Office Action issued in Indian Application No. 202137024069 dated Feb. 23, 2022, 5 pages.
Office Action issued in Chinese Application No. 201980076612.X dated May 31, 2022, 12 pages (with English translation).
Office Action issued in Chinese Application No. 201811467538.8 dated May 20, 2022, 8 pages.
Office Action issued in Japanese Application No. 2021-531579 dated Sep. 6, 2022, 6 pages (with English translation).

\* cited by examiner

INTER PREDICTION METHOD AND RELATED APPARATUS

CROSS-REFERENCE TO RELATED APPLICATION

This application is a continuation of International Application No. PCT/CN2019/122458, filed on Dec. 2, 2019, which claims priority to Chinese Patent Application No. 201811467538.8, filed on Dec. 3, 2018. The disclosures of the aforementioned patent applications are hereby incorporated by reference in their entireties.

TECHNICAL FIELD

This application relates to the field of picture processing technologies, and more specifically, to an inter prediction method and a related apparatus.

BACKGROUND

With the development of information technologies, video services such as high definition television and web conference are developing rapidly. Video signals have become a most important way to obtain information in people's daily life because of their advantages such as intuitiveness and high efficiency. The video signals contain a large amount of data, and therefore occupy a large amount of transmission bandwidth and storage space. For effective transmission and storage of the video signals, the video signals need to be compressed and encoded. Video compression technologies have increasingly become indispensable key technologies in the field of video application. Currently, widely used video coding standards are H.264 and H.265. H.264 may also be referred to as moving picture experts group (MPEG)-4, part 10, or advanced video coding (AVC), or H.264/AVC. H.265 may also be referred to as MPEG-H part 2, or high efficiency video coding (HEVC), or H.265/HEVC.

A general video encoding process typically includes the following stages, intra prediction, inter prediction, transform, quantization, entropy encoding, in-loop filtering, and the like. Video decoding is an inverse process of video encoding. For example, entropy decoding, dequantization, and inverse transform are first performed to obtain residual information, and then whether intra prediction or inter prediction is used for a current block is determined by decoding a bitstream. If intra encoding is used, prediction information is constructed based on pixel values of pixels in a reconstructed region around a current picture by using the intra-prediction method. If inter prediction is used, motion information needs to be obtained through parsing, a reference block is determined in a reconstructed picture based on the obtained motion information, and pixel values of pixels in the reference block are used as prediction information (such a process is referred to as motion compensation (MC)). After the prediction information and the residual information are superposed, a filtering operation is performed to obtain reconstructed information.

A local illumination compensation (LIC) technology is an inter prediction method used to compensate for a luminance difference between a current block and a reference block. By using the LIC technology, a prediction value of the current block is derived according to a linear model constructed based on neighboring reconstructed pixels of the current block and neighboring reconstructed pixels of the reference block. Although the LIC technology can be used to effectively compensate for the luminance difference between the current block and the reference block, the LIC mode for coding is complex, a large quantity of computing resources are consumed, and a coding speed is decreased.

SUMMARY

This application provides an inter prediction method and a related apparatus. The foregoing technical solutions can be used to accelerate a video decoding speed without greatly affecting video quality.

According to a first aspect, an embodiment of this application provides an inter prediction method. The method includes: parsing a bitstream to determine prediction information of a to-be-processed picture block, where when the prediction information indicates that a prediction direction of the to-be-processed picture block is bidirectional prediction, the bitstream does not include target identification information, where the target identification information is used to indicate to perform local illumination compensation LIC on the to-be-processed picture block; and obtaining a prediction value of the to-be-processed picture block based on the prediction information. Based on the foregoing technical solution, in a process of decoding the to-be-processed picture block, if the prediction direction of the to-be-processed picture block is bidirectional prediction, it may be directly determined that LIC does not need to be performed on the to-be-processed picture block. In this way, consumed computation resources can be reduced on a decoder side, and a decoding speed can be increased. In addition, video quality is not greatly affected even though LIC is not performed on the to-be-processed picture block whose prediction direction is bidirectional prediction. Therefore, according to the foregoing technical solution, the video decoding speed can be accelerated without greatly affecting video quality.

With reference to the first aspect, in a possible implementation of the first aspect, when the prediction information of the to-be-processed picture block indicates that a prediction mode of the to-be-processed picture block is a merge mode, before the obtaining a prediction value of the to-be-processed picture block based on the prediction information, the method further includes: determining at least one first information group, where each first information group includes a motion vector, a prediction direction, and an LIC identifier; and when a quantity of the at least one first information group is less than a target preset value, determining at least one second information group based on the at least one first information group, where each second information group includes a motion vector, a prediction direction, and an LIC identifier; and the obtaining a prediction value of the to-be-processed picture block based on the prediction information includes: obtaining the prediction value of the to-be-processed picture block based on the prediction information, the at least one first information group, and the at least one second information group.

With reference to the first aspect, in a possible implementation of the first aspect, the at least one first information group includes a first selection information group and a second selection information group, the at least one second information group includes a first synthetic information group, and the determining at least one second information group based on the at least one first information group includes: using an average value of a motion vector in the first selection information group and a motion vector in the second selection information group as a motion vector in the first synthetic information group.

With reference to the first aspect, in a possible implementation of the first aspect, the prediction direction includes bidirectional prediction and unidirectional prediction, the unidirectional prediction includes first-directional prediction and second-directional prediction, the at least one first information group includes a first selection information group and a second selection information group, the at least one second information group includes a first synthetic information group, and the determining at least one second information group based on the at least one first information group includes: determining a prediction direction in the first synthetic information group based on a prediction direction in the first selection information group and a prediction direction in the second selection information group.

With reference to the first aspect, in a possible implementation of the first aspect, when LIC is performed on the to-be-processed picture block, an LIC identifier of the to-be-processed picture block is a first value; or when LIC is not performed on the to-be-processed picture block, an LIC identifier of the to-be-processed picture block is a second value; and the determining at least one second information group based on the at least one first information group includes: when the prediction direction in the first synthetic information group is bidirectional prediction, determining that an LIC identifier in the first synthetic information group is the second value; when the prediction direction in the first synthetic information group is unidirectional prediction, and an LIC identifier in the first selection information group and an LIC identifier in the second selection information group each are the second value, determining that an LIC identifier in the first synthetic information group is the second value; or when the prediction direction in the first synthetic information group is unidirectional prediction, and an LIC identifier in the first selection information group and/or an LIC identifier in the second selection information group are/is the first value, determining that an LIC identifier in the first synthetic information group is the first value. Based on the foregoing technical solution, in the at least one second information group, an LIC identifier in a second information group whose prediction direction is bidirectional prediction is the second value. In this case, if the second information group whose prediction direction is bidirectional prediction is used to determine the prediction value of the to-be-processed picture block, LIC does not need to be performed on the to-be-processed picture block in the determining process. In this way, consumed computation resources can be reduced on the decoder side, and the decoding speed can be increased. In addition, video quality is not greatly affected even though LIC is not performed. Therefore, according to the foregoing technical solution, the video decoding speed can be accelerated without greatly affecting video quality.

With reference to the first aspect, in a possible implementation of the first aspect, when the prediction information of the to-be-processed picture block indicates that a prediction mode of the to-be-processed picture block is a merge mode, before the obtaining a prediction value of the to-be-processed picture block based on the prediction information, the method further includes: determining at least one third information group, where each third information group includes a motion vector and an LIC identifier; when a quantity of the at least one third information group is less than a target preset value, determining at least one fourth information group based on the at least one third information group, where each fourth information group includes a motion vector and an LIC identifier; and the obtaining a prediction value of the to-be-processed picture block based on the prediction information includes: obtaining the prediction value of the to-be-processed picture block based on the prediction information, the at least one third information group, and the at least one fourth information group.

With reference to the first aspect, in a possible implementation of the first aspect, the prediction direction includes bidirectional prediction and unidirectional prediction, the unidirectional prediction includes first-directional prediction and second-directional prediction, the at least one third information group includes a third selection information group and a fourth selection information group, the at least one fourth information group includes a second synthetic information group, and the determining at least one fourth information group based on the at least one third information group includes: using a motion vector that is of the first-directional prediction and that corresponds to the third selection information group as a motion vector that is of the first-directional prediction and that corresponds to the second synthetic information group, and using a motion vector that is of the second-directional prediction and that corresponds to the fourth selection information group as a motion vector that is of the second-directional prediction and that corresponds to the second synthetic information group; or using a motion vector that is of the second-directional prediction and that corresponds to the third selection information group as a motion vector that is of the first-directional prediction and that corresponds to the second synthetic information group, and using a motion vector that is of the first-directional prediction and that corresponds to the fourth selection information group as a motion vector that is of the second-directional prediction and that corresponds to the second synthetic information group.

With reference to the first aspect, in a possible implementation of the first aspect, when LIC is performed on the to-be-processed picture block, an LIC identifier of the to-be-processed picture block is a first value; or when LIC is not performed on the to-be-processed picture block, an LIC identifier of the to-be-processed picture block is a second value, and the determining at least one fourth information group based on the at least one third information group includes: determining that an LIC identifier in each of the at least one fourth information group is the second value. Based on the foregoing technical solution, the LIC identifier in each of the at least one fourth information group is a second identifier. In this case, if one of the at least one fourth information group is used to determine the prediction value of the to-be-processed picture block, LIC does not need to be performed on the to-be-processed picture block in the determining process. In this way, consumed computation resources can be reduced on the decoder side, and the decoding speed can be increased. In addition, video quality is not greatly affected even though LIC is not performed. Therefore, according to the foregoing technical solution, the video decoding speed can be accelerated without greatly affecting video quality.

With reference to the first aspect, in a possible implementation of the first aspect, the at least one first information group includes a fifth selection information group, and the determining at least one first information group includes: determining a target picture block in a reconstructed picture frame temporarily adjacent to a picture frame in which the to-be-processed picture block is located; determining a prediction direction in the fifth selection information group based on the target picture block; and when the prediction direction in the fifth selection information group is bidirectional prediction, determining that an LIC identifier in the fifth selection information group is the second value. Based on the foregoing technical solution, the LIC identifier in the fifth selection information group is a second identifier. In this case, if the fifth selection information group is used to determine the prediction value of the to-be-processed picture block, LIC does not need to be performed on the to-be-processed picture block in the determining process. In this way, consumed computation resources can be reduced on the decoder side, and the decoding speed can be increased. In addition, video quality is not greatly affected even though LIC is not performed. Therefore, according to the foregoing technical solution, the video decoding speed can be accelerated without greatly affecting video quality.

With reference to the first aspect, in a possible implementation of the first aspect, when a sum of the quantity of the at least one first information group and a quantity of the at least one second information group is less than the target preset value, before the obtaining a prediction value of the to-be-processed picture block based on the prediction information, the method further includes: determining at least one fifth information group, where an LIC identifier in the fifth information group is the second value, and a sum of the quantity of the at least one first information group, the quantity of the at least one second information group, and a quantity of the at least one fifth information group is equal to the target preset value; and the obtaining a prediction value of the to-be-processed picture block based on the prediction information includes: obtaining the prediction value of the to-be-processed picture block based on the prediction information, the at least one first information group, the at least one second information group, and the at least one fifth information group Based on the foregoing technical solution, the LIC identifier in each of the at least one fifth information group is a second identifier. In this case, if one of the at least one fifth information group is used to determine the prediction value of the to-be-processed picture block, LIC does not need to be performed on the to-be-processed picture block in the determining process. In this way, consumed computation resources can be reduced on the decoder side, and the decoding speed can be increased. In addition, video quality is not greatly affected even though LIC is not performed. Therefore, according to the foregoing technical solution, the video decoding speed can be accelerated without greatly affecting video quality.

With reference to the first aspect, in a possible implementation of the first aspect, when a sum of a quantity of the at least one third information group and a quantity of the at least one fourth information group is less than the target preset value, before the obtaining a prediction value of the to-be-processed picture block based on the prediction information, the method further includes: determining at least one sixth information group, where an LIC identifier in the sixth information group is the second value, and a sum of the quantity of the at least one third information group, the quantity of the at least one fourth information group, and a quantity of the at least one sixth information group is equal to the target preset value; and the obtaining a prediction value of the to-be-processed picture block based on the prediction information includes: obtaining the prediction value of the to-be-processed picture block based on the prediction information, the at least one third information group, the at least one fourth information group, and the at least one sixth information group. Based on the foregoing technical solution, the LIC identifier in each of the at least one sixth information group is a second identifier. In this case, if one of the at least one sixth information group is used to determine the prediction value of the to-be-processed picture block, LIC does not need to be performed on the to-be-processed picture block in the determining process. In this way, consumed computation resources can be reduced on the decoder side, and the decoding speed can be increased. In addition, video quality is not greatly affected even though LIC is not performed. Therefore, according to the foregoing technical solution, the video decoding speed can be accelerated without greatly affecting video quality.

According to a second aspect, an embodiment of this application provides an inter prediction method. The method includes: determining prediction information of a to-be-processed picture block; and determining a bitstream based on the prediction information of the to-be-processed picture block, where when the prediction information indicates that a prediction direction of the to-be-processed picture block is bidirectional prediction, the bitstream does not include target identification information, where the target identification information is used to indicate to perform local illumination compensation LIC on the to-be-processed picture block. When the prediction information indicates that the prediction direction of the to-be-processed picture block is unidirectional prediction and a prediction mode is not a merge mode, the bitstream includes the target identification information. Based on the foregoing technical solution, when the prediction information indicates that the prediction direction of the to-be-processed picture block is bidirectional prediction. LIC does not need to be performed on the to-be-processed picture block in an encoding process. In this way, consumed computation resources can be reduced on an encoder side, and an encoding speed can be increased. In addition, video quality is not greatly affected even though LIC is not performed on the to-be-processed picture block. Therefore, according to the foregoing technical solution, the video encoding speed can be accelerated without greatly affecting video quality.

With reference to the second aspect, in a possible implementation of the second aspect, when the prediction information of the to-be-processed picture block indicates that a prediction mode of the to-be-processed picture block is a merge mode, before the determining a bitstream based on the prediction information of the to-be-processed picture block, the method further includes: determining at least one first information group, where each first information group includes a motion vector, a prediction direction, and an LIC identifier; and when a quantity of the at least one first information group is less than a target preset value, determining at least one second information group based on the at least one first information group, where each second information group includes a motion vector, a prediction direction, and an LIC identifier; and the determining a bitstream based on the prediction information of the to-be-processed picture block includes: determining the bitstream based on the prediction information, the at least one first information group, and the at least one second information group.

With reference to the second aspect, in a possible implementation of the second aspect, the at least one first information group includes a first selection information group and a second selection information group, the at least one second information group includes a first synthetic information group, and the determining at least one second information group based on the at least one first information group includes: using an average value of a motion vector in the first selection information group and a motion vector in the second selection information group as a motion vector in the first synthetic information group.

With reference to the second aspect, in a possible implementation of the second aspect, the prediction direction includes bidirectional prediction and unidirectional prediction, the unidirectional prediction includes first-directional prediction and second-directional prediction, the at least one first information group includes a first selection information group and a second selection information group, the at least one second information group includes a first synthetic information group, and the determining at least one second information group based on the at least one first information group includes: determining a prediction direction in the first synthetic information group based on a prediction direction in the first selection information group and a prediction direction in the second selection information group.

With reference to the second aspect, in a possible implementation of the second aspect, when LIC is performed on the to-be-processed picture block, an LIC identifier of the to-be-processed picture block is a first value; or when LIC is not performed on the to-be-processed picture block, an LIC identifier of the to-be-processed picture block is a second value, the determining at least one second information group based on the at least one first information group includes: when the prediction direction in the first synthetic information group is bidirectional prediction, determining that an LIC identifier in the first synthetic information group is the second value; when the prediction direction in the first synthetic information group is unidirectional prediction, and an LIC identifier in the first selection information group and an LIC identifier in the second selection information group each are the second value, determining that an LIC identifier in the first synthetic information group is the second value; or when the prediction direction in the first synthetic information group is unidirectional prediction, and an LIC identifier in the first selection information group and/or an LIC identifier in the second selection information group are/is the first value, determining that an LIC identifier in the first synthetic information group is the first value. Based on the foregoing technical solution, in the at least one second information group, an LIC identifier in a second information group whose prediction direction is bidirectional prediction is a second identifier. In this case, if the second information group whose prediction direction is bidirectional prediction is used as optimal motion information, LIC does not need to be performed in the determining process. In this way, consumed computation resources can be reduced on the encoder side, and the encoding speed can be increased. In addition, video quality is not greatly affected even though LIC is not performed. Therefore, according to the foregoing technical solution, the video encoding speed can be accelerated without greatly affecting video quality.

With reference to the second aspect, in a possible implementation of the second aspect, when the prediction information of the to-be-processed picture block indicates that a prediction mode of the to-be-processed picture block is a merge mode, before the determining a bitstream based on the prediction information, the method further includes: determining at least one third information group, where each third information group includes a motion vector and an LIC identifier; when a quantity of the at least one third information group is less than a target preset value, determining at least one fourth information group based on the at least one third information group, where each fourth information group includes a motion vector and an LIC identifier; and the determining a bitstream based on the prediction information includes: determining the bitstream based on the prediction information, the at least one third information group, and the at least one fourth information group.

With reference to the second aspect, in a possible implementation of the second aspect, the prediction direction includes bidirectional prediction and unidirectional prediction, the unidirectional prediction includes first-directional prediction and second-directional prediction, the at least one third information group includes a third selection information group and a fourth selection information group, the at least one fourth information group includes a second synthetic information group, and the determining at least one fourth information group based on the at least one third information group includes: using a motion vector that is of the first-directional prediction and that corresponds to the third selection information group as a motion vector that is of the first-directional prediction and that corresponds to the second synthetic information group, and using a motion vector that is of the second-directional prediction and that corresponds to the fourth selection information group as a motion vector that is of the second-directional prediction and that corresponds to the second synthetic information group; or using a motion vector that is of the second-directional prediction and that corresponds to the third selection information group as a motion vector that is of the first-directional prediction and that corresponds to the second synthetic information group, and using a motion vector that is of the first-directional prediction and that corresponds to the fourth selection information group as a motion vector that is of the second-directional prediction and that corresponds to the second synthetic information group.

With reference to the second aspect, in a possible implementation of the second aspect, when LIC is performed on the to-be-processed picture block, an LIC identifier of the to-be-processed picture block is a first value; or when LIC is not performed on the to-be-processed picture block, an LIC identifier of the to-be-processed picture block is a second value, and the determining at least one fourth information group based on the at least one third information group includes: determining that an LIC identifier in each of the at least one fourth information group is the second value. Based on the foregoing technical solution, the LIC identifier in each of the at least one fourth information group is a second identifier. In this case, if one of the at least one fourth information group is used as optimal motion information, LIC does not need to be performed in the determining process. In this way, consumed computation resources can be reduced on the encoder side, and the encoding speed can be increased. In addition, video quality is not greatly affected even though LIC is not performed. Therefore, according to the foregoing technical solution, the video encoding speed can be accelerated without greatly affecting video quality.

With reference to the second aspect, in a possible implementation of the second aspect, the at least one first information group includes a fifth selection information group, and the determining at least one first information group includes: determining a target picture block in a reconstructed picture frame temporarily adjacent to a picture frame in which the to-be-processed picture block is located, determining a prediction direction in the fifth selection information group based on the target picture block; and when the prediction direction in the fifth selection information group is bidirectional prediction, determining that an LIC identifier in the fifth selection information group is the second value. Based on the foregoing technical solution, the LIC identifier in the fifth selection information group is a second identifier. In this case, if the fifth selection information group is used as optimal motion information, LIC does not need to be performed in the determining process. In this way, consumed computation resources can be reduced on the encoder side, and the encoding speed can be increased. In addition, video quality is not greatly affected even though LIC is not performed. Therefore, according to the foregoing technical solution, the video encoding speed can be accelerated without greatly affecting video quality.

With reference to the second aspect, in a possible implementation of the second aspect, when a sum of the quantity of the at least one first information group and a quantity of the at least one second information group is less than the target preset value, before the determining a bitstream based on the prediction information, the method further includes: determining at least one fifth information group, where an LIC identifier in the fifth information group is the second value, and a sum of the quantity of the at least one first information group, and the quantity of the at least one second information group, and a quantity of the at least one fifth information group is equal to the target preset value, and the determining a bitstream based on the prediction information includes: determining the bitstream based on the prediction information, the at least one first information group, the at least one second information group, and the at least one fifth information group. Based on the foregoing technical solution, the LIC identifier in each of the at least one fifth information group is a second identifier. In this case, if one of the at least one fifth information group is used as optimal motion information, LIC does not need to be performed in the determining process. In this way, consumed computation resources can be reduced on the encoder side, and the encoding speed can be increased. In addition, video quality is not greatly affected even though LIC is not performed. Therefore, according to the foregoing technical solution, the video encoding speed can be accelerated without greatly affecting video quality.

With reference to the second aspect, in a possible implementation of the second aspect, when a sum of a quantity of the at least one third information group and a quantity of the at least one fourth information group is less than the target preset value, before the determining a bitstream based on the prediction information, the method further includes: determining at least one sixth information group, where an LIC identifier in the sixth information group is the second value, and a sum of the quantity of the at least one third information group, the quantity of the at least one fourth information group, and a quantity of at least one sixth information group is equal to the target preset value; and the determining a bitstream based on the prediction information includes: determining the bitstream based on the prediction information, the at least one third information group, the at least one fourth information group, and the at least one sixth information group. Based on the foregoing technical solution, the LIC identifier in each of the at least one sixth information group is a second identifier. In this case, if one of the at least one sixth information group is used as optimal motion information, LIC does not need to be performed in the determining process. In this way, consumed computation resources can be reduced on the encoder side, and the encoding speed can be increased. In addition, video quality is not greatly affected even though LIC is not performed. Therefore, according to the foregoing technical solution, the video encoding speed can be accelerated without greatly affecting video quality.

According to a third aspect, an embodiment of this application provides a decoding apparatus. The apparatus includes modules configured to perform the method according to any one of the first aspect or the possible implementations of the first aspect.

Optionally, the decoding apparatus in the third aspect may be a computer device, or may be a component (for example, a chip or a circuit) that can be used on a computer device.

According to a fourth aspect, an embodiment of this application provides an encoding apparatus. The apparatus includes modules configured to perform the method according to any one of the second aspect or the possible implementations of the second aspect.

Optionally, the encoding apparatus in the fourth aspect may be a computer device, or may be a component (for example, a chip or a circuit) that can be used on a computer device.

According to a fifth aspect, an embodiment of this application provides a storage medium. The storage medium stores instructions used to implement the method according to any one of the first aspect or the possible implementations of the first aspect.

According to a sixth aspect, an embodiment of this application provides a storage medium. The storage medium stores instructions used to implement the method according to any one of the second aspect or the possible implementations of the second aspect.

According to a seventh aspect, this application provides a computer program product including instructions. When the computer program product runs on a computer, the computer is enabled to perform the method according to any one of the first aspect or the possible implementations of the first aspect.

According to an eighth aspect, this application provides a computer program product including instructions. When the computer program product runs on a computer, the computer is enabled to perform the method according to any one of the second aspect or the possible implementations of the second aspect.

DESCRIPTION OF EMBODIMENTS

Figure 1:
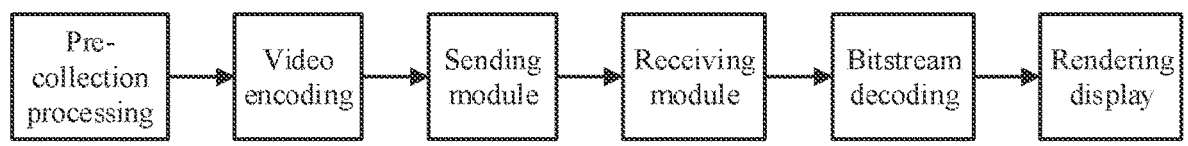
FIG. 1 is a schematic diagram of a system architecture to which an inter prediction method provided in an embodiment of this application is applicable.

The following describes the technical solutions of this application with reference to the accompanying drawings.

In this application, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be singular or plural. The character "/" usually represents an "or" relationship between the associated objects. "At least one of the following items (pieces)" or a similar expression thereof means any combination of these items, including a single item (piece) or any combination of a plurality of items (pieces). For example, at least one of a, b, or c may indicate: a, b, c, a-b, a-c, b-c, or a-b-c, where a, b, and c may be in a singular or plural form. In addition, in the embodiments of this application, terms such as "first" and "second" do not limit a quantity or an execution sequence.

It should be noted that in this application, the term such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of "example" or "for example" is intended to present a relative concept in a specific manner.

A computer device in the embodiments of this application is any computer device that can perform video encoding and/or video decoding. For example, the computer device may be a computer, a notebook computer, a mobile terminal, or a tablet computer.

In the embodiments of this application, the computer device may include a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant communications software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by a terminal device, a network device, or a functional module that is in a terminal device or a network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable medium" may include but is not limited to a radio channel, and various other media that can store, contain, and/or carry instructions and/or data.

To help a person skilled in the art better understand the technical solutions in this application, some key concepts in the embodiments of this application are first described.

Picture block: In a video coding process, a picture block is used as a basic unit for various types of encoding operations, for example, block-based prediction, transform, and entropy encoding. The picture block may also be referred to as a picture unit, a coding unit, or the like. A picture block is a two-dimensional sample array, and may be a square array, or may be a rectangular array. For example, a picture block of a 4×4 size may be considered as a square sample array constituted by a total of 4×4=16 samples.

A signal in the picture block is a sample value of a sample in the picture block. A sample may also be referred to as a pixel or a pel. Correspondingly, a value of the sample may also be referred to as a pixel value.

A current block (which may also be referred to as a to-be-processed picture block, a current picture block, or a current coding unit) refers to a picture block that is currently being processed. For example, during encoding, the current block is a block that is currently being encoded; and during decoding, the current block is a block that is being decoded.

A reference block (which may also be referred to as a reference picture block or a reference coding unit) is a picture block that provides a reference signal for a current block. In a search process, a plurality of reference blocks need to be traversed to find an optimal reference block.

A prediction block (which may also be referred to as a prediction picture block or a prediction coding unit) is a block that provides prediction for a current block. For example, after a plurality of reference blocks are traversed, an optimal reference block is found. The optimal reference block provides prediction for the current block, and this block is referred to as a prediction block.

There are two prediction modes: intra prediction and inter prediction.

Inter prediction: The inter prediction is a process in which a reconstructed picture is searched for a matched reference block for a current coding block in a current picture, a pixel value of a pixel in the reference block is used as a prediction value of the pixel value of the pixel in the current coding block (this process may be referred to as motion estimation (ME)).

There are two inter prediction modes: an advanced motion vector prediction (AMVP) mode and a merge mode.

Prediction direction: There may be unidirectional prediction or bidirectional prediction. More specifically, unidirectional prediction includes first-directional prediction and second-directional prediction, where first-directional prediction is different from second-directional prediction. Optionally, in some embodiments, the first-directional prediction may be forward prediction, and the second-directional prediction may be backward prediction. Optionally, in some other embodiments, the first-directional prediction may be backward prediction.

Forward prediction selects one reference picture from a first reference picture set, to obtain a reference block for a current picture block. Backward prediction selects one reference picture from a second reference picture set, to obtain a reference block for a current picture block.

The first reference picture set is a reference picture list 0 (reference picture list 0, list 0 for short), and the second reference picture set is a reference picture list 1 (reference picture list 1, list 1 for short). Alternatively, the first reference picture set is a list 1, and the second reference picture set is a list 0.

Bidirectional prediction selects a reference picture from a first reference picture set and a reference picture from a second reference picture set, to obtain reference blocks. When the bidirectional prediction method is used, the current picture block has two reference blocks. Each reference block is indicated by a motion vector and a reference frame index. Then, a prediction value of a pixel value of a pixel in the current picture block is determined based on pixel values of pixels in the two reference blocks.

FIG. 1 is a schematic diagram of a system architecture to which an inter prediction method provided in an embodiment of this application is applicable. As shown in FIG. 1, an existing video transmission system typically includes collection, encoding, sending, receiving, decoding, and display. A collection module includes a camera or a camera module and a pre-processor, and converts an optical signal into a digital video sequence. Then, the video sequence is encoded by an encoder and converted into a bitstream. The bitstream is then sent by a sending module to a receiving module via a network, converted by the receiving module, and decoded and reconstructed by a decoder into a video sequence. Finally, a reconstructed video sequence undergoes post processing such as rendering, and sent to a display device for display. The inter prediction method provided in the embodiments of this application may be applied to a video encoding process and a video decoding process. For ease of description, in the video transmission system, a computer device that generates a video bitstream and sends the bitstream may be referred to as a source device, an encoding device, an encoding apparatus, or the like, and a computer device that receives the video bitstream and decodes the bitstream may be referred to as a destination device, a decoding device, a decoding apparatus, or the like.

Figure 2:
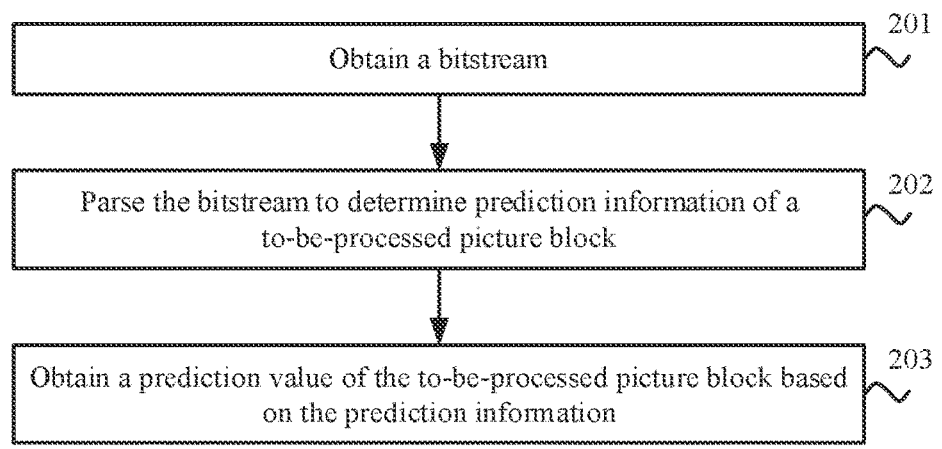
FIG. 2 is a schematic flowchart of an inter prediction method according to an embodiment of this application.

FIG. 2 is a schematic flowchart of an inter prediction method according to an embodiment of this application. The method shown in FIG. 2 may be performed by a destination device.

201: Obtain a bitstream.

202. Parse the bitstream to determine prediction information of a to-be-processed picture block.

The prediction information of the to-be-processed picture block may include a prediction mode of the to-be-processed picture block. It may be understood that because the embodiment shown in FIG. 2 is an embodiment of the inter prediction method, the prediction mode, obtained in step 202, of the to-be-processed picture block in the prediction information is inter prediction.

The prediction information of the to-be-processed picture block may further include a prediction direction of the to-be-processed picture block. When the prediction information indicates that the prediction direction of the to-be-processed picture block is bidirectional prediction, the bitstream does not include target identification information, where the target identification information is used to indicate to perform LIC on the to-be-processed picture block. When the prediction information indicates that the prediction direction of the to-be-processed picture block is unidirectional prediction, the bitstream includes the target identification information.

203: Obtain a prediction value of the to-be-processed picture block based on the prediction information.

A specific implementation of obtaining the prediction value of the to-be-processed picture block based on the prediction information and a specific operation of processing the to-be-processed picture block after the prediction value is obtained are not limited in this embodiment of this application.

Optionally, in some embodiments, the prediction information may further indicate that the prediction mode is a merge mode. In this case, before step 203 is performed, a merge candidate list may be further constructed.

Figure 3:
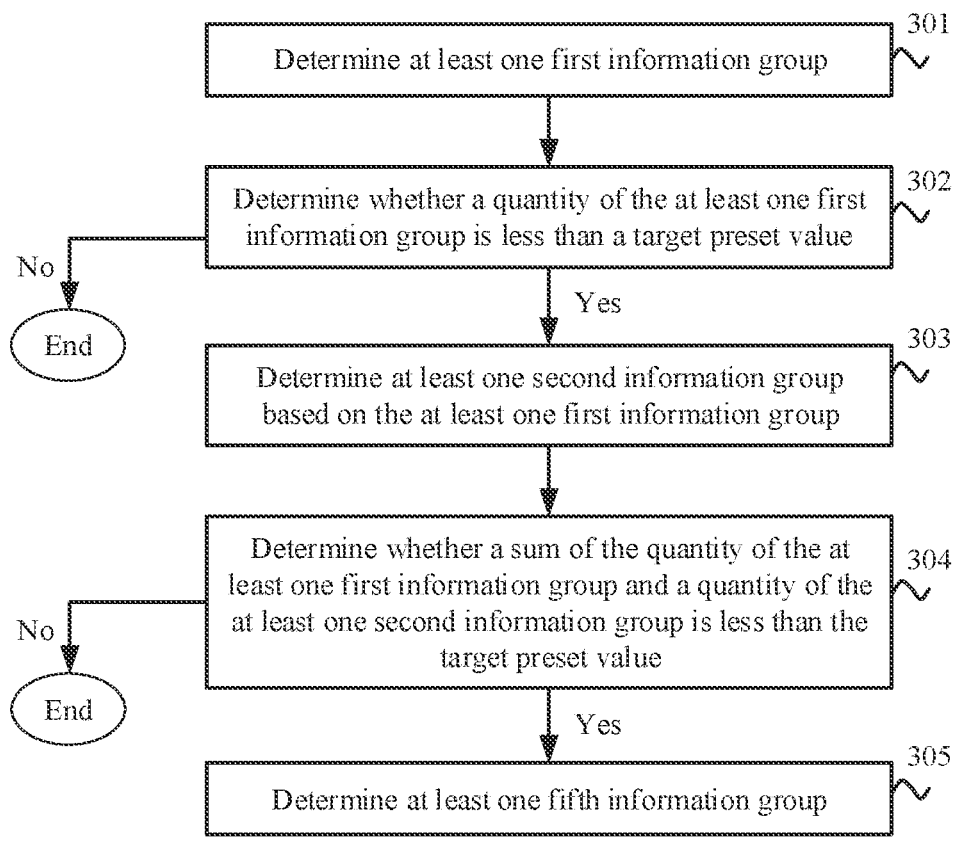
FIG. 3 is a schematic diagram of constructing a merge candidate list according to an embodiment of this application.

FIG. 3 is a schematic diagram of constructing a merge candidate list according to an embodiment of this application.

301: Determine at least one first information group, where each first information group includes a motion vector, a prediction direction, and an LIC identifier. Each first information group may further include a reference frame index.

The at least one first information group may be determined based on picture block information of a picture block spatially adjacent to the to-be-processed picture block and picture block information of a picture block temporally adjacent to the to-be-processed picture block. The picture block information may include a motion vector, a prediction direction, an LIC identifier, and a reference frame index.

Specifically, determining the at least one first information group may be implemented based on the following steps.

Step 1: Obtain N pieces of picture block information, and determine picture block information in a merge candidate list based on the N pieces of picture block information. The N pieces of picture block information are picture block information of N picture blocks spatially adjacent to the to-be-processed picture block, where N is a positive integer greater than or equal to 1. For ease of description, a picture block spatially adjacent to the to-be-processed picture block is briefly referred to as a spatially adjacent picture block below. The N spatially adjacent picture blocks may have a same size or different sizes. A size of the N spatially adjacent picture blocks may be the same as a size of the to-be-processed picture block, or may be different from a size of the to-be-processed picture block. For example, the size of the to-be-processed picture block may be greater than the size of the spatially adjacent picture block.

Figure 4:
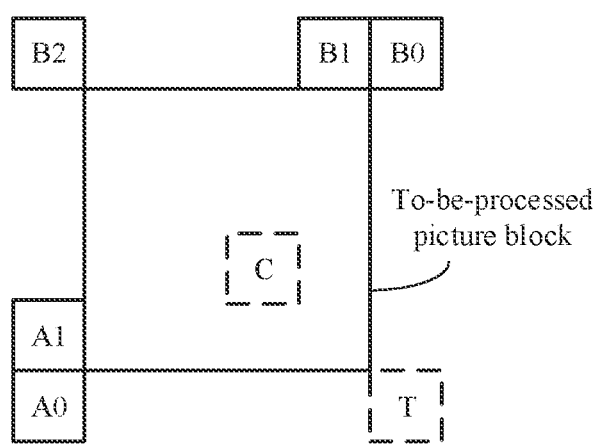
FIG. 4 shows a position relationship between a to-be-processed picture block and adjacent picture blocks.

For example, FIG. 4 shows a position relationship between the to-be-processed picture block and adjacent picture blocks. A value of N may be 4, and the N spatially adjacent picture blocks may be A0, A1, B0, and B1. It may be understood that FIG. 4 is merely intended to help a person skilled in the art better understand the position relationship between the to-be-processed picture block and spatially adjacent picture blocks, and does not constitute any limitation on a quantity of spatially adjacent picture blocks and the position relationship between the to-be-processed picture block and spatially adjacent picture blocks. For example, in some embodiments, the value of N may be greater than 4. In some other embodiments, the value of N may be less than 4. For example, in FIG. 4, A0 is located in the lower left of the to-be-processed picture block. In some embodiments, A0 may alternatively be located in the upper left of the to-be-processed picture block (that is, a position of B2 in FIG. 4).

Repeated picture block information is deleted from the N pieces of picture block information. Optionally, in some embodiments, if content of two or more pieces of picture block information are completely the same, it may be determined that the picture block information is repeated picture block information. In this case, only one piece of the repeated picture block information may be retained. Optionally, in some other embodiments, if there is repeated content in two or more pieces of picture block information, it may be determined that the picture block information is repeated picture block information. In this case, one piece of picture block information in the repeated picture block information may be randomly reserved.

Unavailable picture block information is deleted from the N pieces of picture block information. The unavailable picture block information may mean that all information included in the picture block information is null (null). FIG. 4 is still used as an example. It is assumed that the to-be-processed picture block is located in the upper left of a picture. In this case, there are no pixels at positions of the adjacent picture blocks A0 and A1. In this case, picture block information of both the picture block A0 and the picture block A1 may be set to null.

After the repeated picture block information and the unavailable picture block information are deleted, the remaining picture block information is used as picture block information in the merge candidate list. For ease of description, it is assumed that a quantity of pieces of the remaining picture block information is $N_1$, and $N_1$ may be a positive integer greater than or equal to 1.

Step 2: Determine whether $N_1$ is less than N.

If $N_1$ is equal to N, step 3 is directly performed.

If $N_1$ is less than N, picture block information of another picture block spatially adjacent to the to-be-processed picture block may be further obtained. If the picture block information is available picture block information and is not repeated picture block information (that is, the picture block information is different from any piece of picture block information in the $N_1$ pieces of picture block information), the picture block information is used as one piece of picture block information in the merge candidate list.

Step 3: Obtain a target picture block in a reconstructed picture frame temporally adjacent to the to-be-processed picture block, determine picture block information corresponding to the target picture block, and use the picture block information corresponding to the target picture block as one piece of picture block information in the merge candidate list.

Optionally, in some embodiments, the reconstructed picture frame temporally adjacent to the to-be-processed picture block may include a forward temporally adjacent reconstructed picture frame (for ease of description, referred to as a forward reconstructed picture frame for short below) and a backward temporally adjacent reconstructed picture frame (for ease of description, referred to as a backward reconstructed picture frame for short below). In this case, a target picture block (referred to as forward target picture block for short below) may be determined from the forward reconstructed picture frame, and a target picture block (backward target picture block for short below) may be determined from the backward reconstructed picture frame. In other words, the target picture block determined in step 3 may include a forward target picture block and a backward target picture block.

Optionally, in some other embodiments, the reconstructed picture frame temporarily adjacent to the to-be-processed picture block may include only a forward reconstructed picture frame. Correspondingly, the target picture block determined in step 3 is a forward target picture block.

Optionally, in some other embodiments, the reconstructed picture frame temporarily adjacent to the to-be-processed picture block may include only a backward reconstructed picture frame. Correspondingly, the target picture block determined in step 3 is a backward target picture block.

To distinguish between picture block information corresponding to the target picture block and picture block information of the target picture block, the picture block information corresponding to the target picture block is referred to as a fifth selection information group below.

A prediction direction in the fifth selection information group may be determined based on the target picture block.

For example, if the target picture block includes a forward target picture block and a backward target picture block, the prediction direction in the fifth selection information group is bidirectional prediction. An LIC identifier in the fifth selection information group is a second value. When LIC is performed on the to-be-processed picture block, an LIC identifier of the to-be-processed picture block is set to a first value. When LIC is not performed on the to-be-processed picture block, an LIC identifier of the to-be-processed picture block is set to the second value. A reference frame index in the fifth selection group information may be the same as a reference frame index in picture block information of the forward target picture block, or may be the same as a reference frame index in picture block information of the backward target picture block. Similarly, a motion vector in the fifth selection group information may be the same as a motion vector in the picture block information of the forward target picture block, or may be the same as a motion vector in the picture block information of the backward target picture block.

For another example, if the target picture block is a forward target picture block, a prediction direction in the fifth selection information group is forward prediction. An LIC identifier in the fifth selection information group is a second value. A reference frame index in the fifth selection group information may be the same as a reference frame index in picture block information of the forward target picture block. A motion vector in the fifth selection group information may be the same as a motion vector in the picture block information of the forward target picture block.

For another example, if the target picture block is a backward target picture block, a prediction direction in the fifth selection information group is backward prediction. An LIC identifier in the fifth selection information group is a second value. A reference frame index in the fifth selection group information may be the same as a reference frame index in the picture block information of the backward target picture block. A motion vector in the fifth selection group information may be the same as a motion vector in the picture block information of the backward target picture block.

FIG. 4 further shows a position relationship between the target picture block and the to-be-processed picture block. The target picture block shown in FIG. 4 may be a forward target picture block or a backward target picture block. As shown in FIG. 4, a picture block T is the target picture block. As shown in FIG. 4, the picture block T is a picture block spatially adjacent to a picture block that is in a reconstructed picture frame and that has a same position as a position of the to-be-processed picture block, where the reconstructed picture frame is temporarily adjacent to the to-be-processed picture block. For ease of description, the picture block that is in the reconstructed picture frame and that has a same position as a position of the to-be-processed picture block is referred to as a collocated to-be-processed picture block for short below.

In some embodiments, the picture block T may not exist. For example, the collocated to-be-processed picture block may be located in the lower right of the picture frame. In this case, one picture block in collocated to-be-processed picture blocks may be used as the target picture block. For example, the target picture block may be a picture block C shown in FIG. 4. It may be understood that the target picture block may alternatively be a picture block at a position other than the position of the picture block C shown in FIG. 4, provided that the target picture block is located within a range of the collocated to-be-processed picture block.

For ease of description, in the following, it is assumed that the merge candidate list includes a total of $N_2$ pieces of picture block information after the foregoing step 1 to step 3 are performed, where $N_2$ is a positive integer greater than or equal to 1. The $N_2$ pieces of picture block information are the at least one first information group determined in step 301. In other words, the picture block information that is in the merge candidate list and that is determined by performing the foregoing step 1 to step 3 may be referred to as the first information group.

Table 1 schematically lists the merge candidate list determined in step 301.

TABLE 1

| Index | Motion vector | Prediction direction | Reference frame index | LIC identifier |
|---|---|---|---|---|
| 0 | MV 1 | PRED 1 | RI 1 | 0 |
| 1 | MV 2 | PRED 2 | RI 2 | 1 |
| 2 | MV 3 | PRED 3 | RI 3 | 0 |

Table 1 lists a total of three first information groups. For ease of description, in Table 1, MV 1, MV 2, and MV 3 represent motion vectors in the three first information groups; PRED 1, PRED 2, and PRED 3 represent prediction directions in the three first information groups; and RI 1, RI 2, and RI 3 represent reference frame indexes in the three first information groups. It can be seen from Table 1 that an LIC identifier in a first information group 0 (that is, the $1^{st}$ first information group in Table 1) is 0, an LIC identifier in a first information group 1 (that is, the $2^{nd}$ first information group in Table 1) is 1, and an LIC identifier in a first information group 2 (that is, the $3^{rd}$ first information group in Table 1) is 0. Optionally, in some embodiments, an LIC identifier (LIC flag) being 0 may specify that an LIC mode is not used, and an LIC identifier being 1 may specify that an LIC mode is used. Optionally, in some other embodiments, an LIC identifier (LIC flag) being 1 may specify that an LIC mode is not used, and an LIC identifier being 0 may specify that an LIC mode is used. Further, as listed in Table 1, each of the three first information groups has an index.

Optionally, in some other embodiments, the merge candidate list may not include an index. In other words, the merge candidate list may not include the index column listed in Table 1.

302: Determine whether a quantity of the at least one first information group is less than a target preset value. For ease of description, in the following, it is assumed that the target preset value is $N_{max}$.

As described above, after step 301 is performed, there are a total of $N_2$ first information groups in the merge candidate list. Therefore, step 302 may also be described as determining whether $N_2$ is less than $N_{max}$.

If $N_2$ is equal to $N_{max}$, the merge candidate list determined according to step 301 is a final merge candidate list.

If $N_2$ is less than $N_{max}$, step 303 is performed.

303: Determine at least one second information group based on the at least one first information group, where each second information group includes a motion vector, a prediction direction, and an LIC identifier, and each second information group may further include a reference frame index.

One of the at least one second information group is determined based on two first information groups of the at least one first information group. For ease of description, the following uses one second information group as an example to briefly describe how to determine the second information group. For ease of description, the example of the second information group may be referred to as a first synthetic information group. The two first information groups used to determine the first synthetic information group are referred to as a first selection information group and a second selection information group.

Optionally, in some embodiments, the first selection information group and the second selection information group may be determined from the at least one first information group based on a preset index combination. For example, Table 2 is an index combination list.

TABLE 2

| Index combination |
|---|
| 0, 1 |
| 0, 2 |
| 1, 2 |
| 0, 3 |
| 1, 3 |
| 2, 3 |

The index combination list listed in Table 2 includes a total of six index combinations. For example, in the $1^{st}$ index combination, (0, 1) indicates that one second information group is determined based on two first information groups whose index values are 0 and 1 in the at least one first information group. The two first information groups used to determine the second information group may be determined in an order from top to bottom in Table 2. For example, the $1^{st}$ second information group of the at least one second information group is determined based on two first information groups whose index values are 0 and 1 in the at least one first information group, the $2^{nd}$ second information group of the at least one second information group is determined based on two first information groups whose index values are 0 and 2 in the at least one first information group, the $3^{rd}$ second information group of the at least one second information group is determined based on two first information groups whose index values are 1 and 2 in the at least one first information group, and so on.

It may be understood that Table 2 merely schematically lists the preset index combinations. A sequence, a quantity, and a combination mode of the index combinations in the index combination list may be another sequence, another quantity, and another combination mode. These are not listed one by one herein.

Optionally, in some other embodiments, the first selection information group and the second selection information group may alternatively be any two determined first information groups. For example, assuming that a difference between $N_{max}$ and $N_2$ is 1, two first information groups may be randomly determined from the at least one first information group as the first selection information group and the second selection information group.

Optionally, in some other embodiments, the first selection information group and the second selection information group may be determined according to a preset rule other than the preset index combination list. In this case, a destination device may not need to store an index combination list. For example, as described above, if the at least one first information group includes a total of $N_2$ first information groups, the $1^{st}$ second information group of the at least one second information group may be determined based on the $1^{st}$ first information group and the $2^{nd}$ first information group of the $N_2$ first information groups, the $2^{nd}$ second information group may be determined based on the $1^{st}$ first information group and the $3^{rd}$ first information group of the $N_2$ first information groups, the $(N_2-1)^{st}$ second information group may be determined based on the $1^{st}$ first information group and the $N_2$th first information group of the $N_2$ first information groups, the $N_2^{th}$ second information group may be determined based on the $2^{nd}$ first information group and the $3^{rd}$ first information group of the $N_2$ first information groups, and so on.

Optionally, in some embodiments, a motion vector in the first synthetic information group may be an average value of a motion vector in the first selection information group and a motion vector in the second selection information group. More specifically, the average value may be an arithmetic average value.

Optionally, in some embodiments, a prediction direction in the first synthetic information group may be determined based on a prediction direction in the first selection information group and a prediction direction in the second selection information group.

Optionally, in some other embodiments, if the prediction direction in the first selection information group is consistent with the prediction direction in the second selection information group, the prediction direction in the first synthetic information group is the same as the prediction direction in the first selection information group.

For example, if the prediction direction in the first selection information group is forward prediction, and the prediction direction in the second selection information group is forward prediction, the prediction direction in the first synthetic information group is forward prediction.

For another example, if the prediction direction in the first selection information group is backward prediction, and the prediction direction in the second selection information group is backward prediction, the prediction direction in the first synthetic information group is backward prediction.

For another example, if the prediction direction in the first selection information group is bidirectional prediction, and the prediction direction in the second selection information group is bidirectional prediction, the prediction direction in the first synthetic information group is bidirectional prediction.

Optionally, in some other embodiments, if the prediction direction in the first selection information group is different from the prediction direction in the second selection information group, the prediction direction in the first synthetic information group is the same as the prediction direction in the first selection information group.

For example, if the prediction direction in the first selection information group is forward prediction, and the prediction direction in the second selection information group is backward prediction, the prediction direction in the first synthetic information group is forward prediction.

For another example, if the prediction direction in the first selection information group is backward prediction, and the prediction direction in the second selection information group is forward prediction, the prediction direction in the first synthetic information group is backward prediction.

For another example, if the prediction direction in the first selection information group is bidirectional prediction, and the prediction direction in the second selection information group is forward prediction or backward prediction, the prediction direction in the first synthetic information group is bidirectional prediction.

Optionally, in some other embodiments, if the prediction direction in the first selection information group is different from the prediction direction in the second selection information group, the prediction direction in the first synthetic information group is the same as the prediction direction in the second selection information group.

For example, if the prediction direction in the first selection information group is forward prediction, and the prediction direction in the second selection information group is backward prediction, the prediction direction in the first synthetic information group is backward prediction.

For another example, if the prediction direction in the first selection information group is backward prediction, and the prediction direction in the second selection information group is forward prediction, the prediction direction in the first synthetic information group is forward prediction.

For another example, if the prediction direction in the first selection information group is bidirectional prediction, and the prediction direction in the second selection information group is forward prediction, the prediction direction in the first synthetic information group is forward prediction.

For another example, if the prediction direction in the first selection information group is bidirectional prediction, and the prediction direction in the second selection information group is backward prediction, the prediction direction in the first synthetic information group is backward prediction.

Optionally, in some other embodiments, if the prediction direction in the first selection information group is different from the prediction direction in the second selection information group, the prediction direction in the first synthetic information group is bidirectional prediction.

For example, if the prediction direction in the first selection information group is forward prediction, and the prediction direction in the second selection information group is backward prediction, the prediction direction in the first synthetic information group is bidirectional prediction.

For another example, if the prediction direction in the first selection information group is backward prediction, and the prediction direction in the second selection information group is forward prediction, the prediction direction in the first synthetic information group is bidirectional prediction.

For another example, if the prediction direction in the first selection information group is bidirectional prediction, and the prediction direction in the second selection information group is forward prediction or backward prediction, the prediction direction in the first synthetic information group is bidirectional prediction.

For another example, if the prediction direction in the first selection information group is forward prediction or backward prediction, and the prediction direction in the second selection information group is bidirectional prediction, the prediction direction in the first synthetic information group is bidirectional prediction.

Optionally, in some embodiments, when LIC is performed on the to-be-processed picture block, the LIC identifier of the to-be-processed picture block is the first value; or when LIC is not performed on the to-be-processed picture block, the LIC identifier of the to-be-processed picture block is the second value, the determining at least one second information group based on the at least one first information group includes: when the prediction direction in the first synthetic information group is bidirectional prediction, determining that an LIC identifier in the first synthetic information group is the second value; when the prediction direction in the first synthetic information group is unidirectional prediction, and an LIC identifier in the first selection information group and an LIC identifier in the second selection information group each are the second value, determining that an LIC identifier in the first synthetic information group is the second value; or when the prediction direction in the first synthetic information group is unidirectional prediction, and an LIC identifier in the first selection information group and/or an LIC identifier in the second selection information group are/is the first value, determining that an LIC identifier in the first synthetic information group is the first value.

It is assumed that the first value is 1, and the second value is 0. If the prediction direction in the first synthetic information group is bidirectional prediction, it may be determined that the LIC identifier in the first synthetic information group is 0. If the prediction direction in the first synthetic information group is unidirectional prediction, and an LIC identifier in the first selection information group and an LIC identifier in the second selection information group each are 0, it is determined that an LIC identifier in the first synthetic information group is 0. If the prediction direction in the first synthetic information group is unidirectional prediction, and an LIC identifier in the first selection information group and/or an LIC identifier in the second selection information group are/is 1, it is determined that an LIC identifier in the first synthetic information group is 1.

In other words, if a prediction direction in one or more second information groups in the at least one second information group is bidirectional prediction, one or more LIC identifiers in the one or more second information groups each are the second value.

A reference frame index in the first synthetic information group may be determined based on a reference frame index in the first selection information group and a reference frame index in the second selection information group.

For example, a forward reference frame index in the first synthetic information may be determined in the following manner. If the first selection information group and the second selection information group both include a forward direction (that is, the prediction direction is forward prediction or bidirectional prediction), the forward reference frame index in the first synthetic information is a forward reference frame index in the first selection information group. If the first selection information group includes a forward direction, and the second selection information group does not include a forward direction (that is, the prediction direction is backward prediction), the forward reference frame index in the first synthetic information is a forward reference frame index in the first selection information group. If the first selection information group does not include a forward direction, and the second selection information group includes a forward direction, the forward reference frame index in the first synthetic information is a forward reference frame index in the second selection information group. If both the first selection information group and the second selection information group include a backward direction (that is, the prediction direction is backward prediction or bidirectional prediction), a backward reference frame index in the first synthetic information is a backward reference frame index in the first selection information group. If the first selection information group includes a backward direction, and the second selection information group does not include a backward direction (that is, the prediction direction is forward prediction), a backward reference frame index in the first synthetic information is a backward reference frame index in the first selection information group. If the first selection information group does not include a backward direction, and the second selection information group includes a backward direction, a backward reference frame index in the first synthetic information is a backward reference frame index in the second selection information group.

After the at least one second information group is determined, the at least one second information group may be inserted into the merge candidate list. For ease of description, in the following, it is assumed that a quantity of the at least one second information group is $N_3$. In addition, for ease of description, the first information group and the second information group in the candidate information list are collectively referred to as picture block information. After step 303 is performed, the merge candidate list includes a total of $N_2+N_3$ pieces of picture block information.

Optionally, in some embodiments, if one second information group determined based on two first information groups is the same as picture block information that already exists in the candidate information list, the second information group may be deleted, and a new second information group continues to be determined based on other first information groups.

304: Determine whether a sum of the quantity of the at least one first information group and a quantity of the at least one second information group is less than the target preset value. In other words, it is determined whether $N_2+N_3$ is less than $N_{max}$.

If $N_2+N_3$ is equal to $N_{max}$, the merge candidate list is the final merge candidate list.

If $N_2+N_3$ is less than $N_{max}$, step 305 is performed.

It may be understood that step 304 and step 303 may be performed at the same time. In other words, in the process of determining the at least one second information group, if the sum of the quantity of determined second information groups and the quantity of the at least one first information group is equal to the target preset value, the new second information group may not need to be further determined. The determined at least one second information group and the at least one information group constitute the final merge candidate list.

305: Determine at least one fifth information group, where each fifth information group may include an LIC identifier, a prediction direction, a reference frame index, and a motion vector, and the LIC identifier in each of the at least one fifth information group is the second value.

A sum of the quantity of the at least one first information group, the quantity of the at least one second information group, and a quantity of the at least one fifth information group is equal to the target preset value. Therefore, before the at least one fifth information group is determined, the quantity of the at least one fifth information group that needs to be determined may be further determined first. It is assumed that the quantity of the at least one fifth information group is $N_3$, and $N_1+N_2+N_3$ is equal to $N_{max}$.

Optionally, information other than the LIC identifier in the fifth information group may be determined in a preset manner.

For example, if $N_3$ is equal to 1, it is determined that a motion vector in the fifth information group is 0, a reference frame index is −1, and a prediction direction is bidirectional prediction.

For another example, if $N_3$ is equal to 1, it is determined that a motion vector in the fifth information group is 0, a reference frame index is 1, and a prediction direction is forward prediction.

For another example, if $N_3$ is equal to 1, it is determined that a motion vector in the fifth information group is 0, a reference frame index is 1, and a prediction direction is bidirectional prediction.

For another example, if $N_3$ is equal to 2, it is determined that a motion vector in the $1^{st}$ fifth information group of the at least one fifth information group is 0, a reference frame index is −1, and a prediction direction is bidirectional prediction. A motion vector in the $2^{nd}$ fifth information group is 0, a reference frame index is 1, and a prediction direction is forward prediction.

For another example, if $N_3$ is equal to 2, it is determined that a motion vector in the $1^{st}$ fifth information group of the at least one fifth information group is 0, a reference frame index is 1, and a prediction direction is bidirectional prediction. A motion vector in the $2^{nd}$ fifth information group is 0, a reference frame index is 1, and a prediction direction is forward prediction.

For another example, if $N_3$ is equal to 2, it is determined that a motion vector in the $1^{st}$ fifth information group of the at least one fifth information group is 0, a reference frame index is 1, and a prediction direction is bidirectional prediction. A motion vector in the $2^{nd}$ fifth information group is 0, a reference frame index is 1, and a prediction direction is bidirectional prediction.

When $N_3$ is greater than or equal to 3, a corresponding fifth information group may also be determined in a preset manner. Details are not listed herein.

After step 305 is performed, the determined at least one fifth information group may be inserted into the merge candidate list. In addition, for ease of description, the first information group, the second information group, and the fifth information group in the candidate information list are collectively referred to as picture block information. It can be learned that after step 305 is completed, a quantity of pieces of picture block information included in the merge candidate list is the target preset value. In this case, the merge candidate list is the final merge candidate list.

When the merge candidate list is constructed, the obtaining a prediction value of the to-be-processed picture block based on the prediction information includes: obtaining the prediction value of the to-be-processed picture block based on the prediction information and the merge candidate list. In other words, the obtaining a prediction value of the to-be-processed picture block based on the prediction information includes: obtaining the prediction value of the to-be-processed picture block based on the prediction information, the at least one first information group, the at least one second information group, and the at least one fifth information group. A specific implementation of obtaining the prediction value of the to-be-processed picture block based on the prediction information and the merge candidate list is the same as an implementation in a conventional technology. Details are not described herein.

Figure 5:
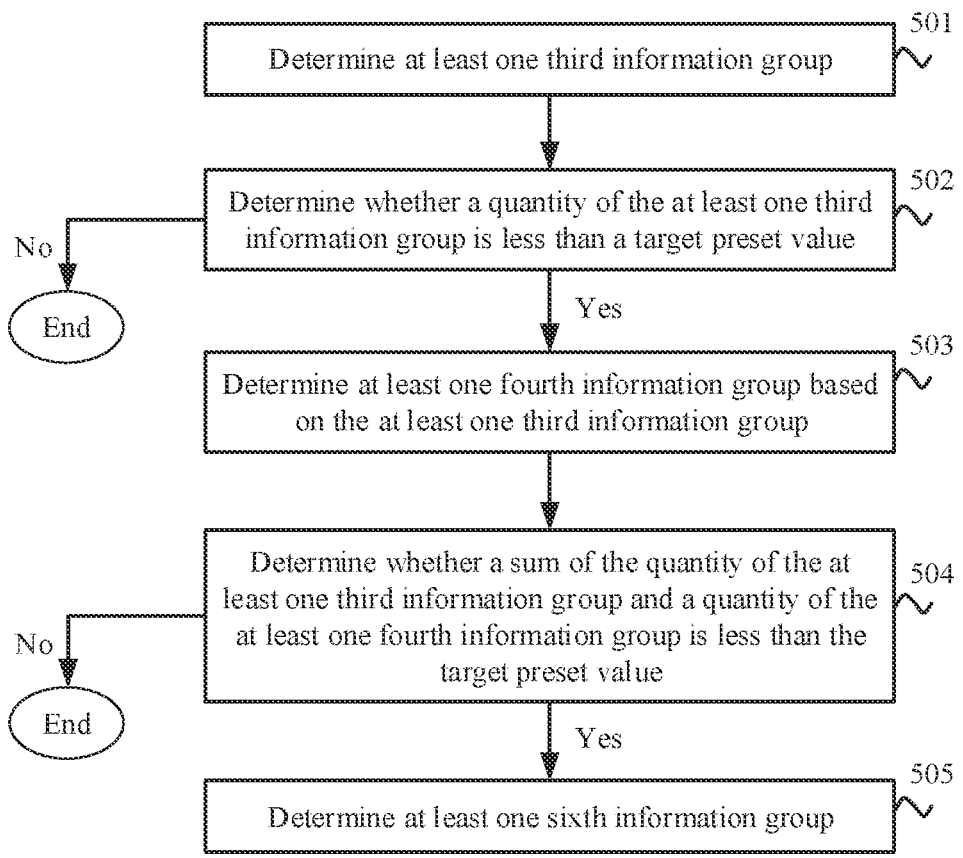
FIG. 5 is another schematic diagram of constructing a merge candidate list according to an embodiment of this application.

FIG. 5 is another schematic diagram of constructing a merge candidate list according to an embodiment of this application.

501: Determine at least one third information group, where each third information group includes a motion vector and an LIC identifier, and each third information group may further include a prediction direction and a reference frame index.

A specific implementation of step 501 is the same as that of step 301, and reference may be made to the description of step 301. Details are not described herein again.

502: Determine whether a quantity of the at least one third information group is less than a target preset value. For ease of description, in the following, it is assumed that the target preset value is $N_{max}$.

As described above, after step 501 is performed, there are a total of $N_2$ third information groups in the merge candidate list. Therefore, step 502 may also be described as determining whether $N_2$ is less than $N_{max}$.

If $N_2$ is equal to $N_{max}$, the merge candidate list determined according to step 501 is a final merge candidate list.

If $N_2$ is less than $N_{max}$, step 503 is performed.

503: Determine at least one fourth information group based on the at least one third information group, where each fourth information group includes a motion vector and an LIC identifier, and each fourth information group may further include a prediction direction and a reference frame index.

One of the at least one fourth information group is determined based on two third information groups of the at least one third information group. For ease of description, the following uses one fourth information group as an example to briefly describe how to determine the fourth information group. For ease of description, the example of the fourth information group may be referred to as a second synthetic information group. Two third information groups used to determine the second synthetic information group are referred to as a third selection information group and a fourth selection information group.

For an implementation of determining the third selection information and the fourth selection information, refer to the implementation of determining the first selection information and the second selection information in the embodiment shown in FIG. 3. Details are not described herein again.

Optionally, in some embodiments, a motion vector in the second synthetic information group may be determined in the following manner: using a motion vector that is of the first-directional prediction and that corresponds to the third selection information group as a motion vector that is of the first-directional prediction and that corresponds to the second synthetic information group, and using a motion vector that is of the second-directional prediction and that corresponds to the fourth selection information group as a motion vector that is of the second-directional prediction and that corresponds to the second synthetic information group. Optionally, in some embodiments, the first-directional prediction is forward prediction, and the second-directional prediction is backward prediction. Optionally, in some other embodiments, the first-directional prediction is backward prediction, and the second-directional prediction is forward prediction.

Optionally, in some other embodiments, a motion vector in the second synthetic information group may be determined in the following manner: using a motion vector that is of the second-directional prediction and that corresponds to the third selection information group as a motion vector that is of the first-directional prediction and that corresponds to the second synthetic information group, and using a motion vector that is of the first-directional prediction and that corresponds to the fourth selection information group as a motion vector that is of the second-directional prediction and that corresponds to the second synthetic information group. Optionally, in some embodiments, the first-directional prediction is forward prediction, and the second-directional prediction is backward prediction. Optionally, in some other embodiments, the first-directional prediction is backward prediction, and the second-directional prediction is forward prediction.

When LIC is performed on the to-be-processed picture block, an LIC identifier of the to-be-processed picture block is set to a first value. When LIC is not performed on the to-be-processed picture block, an LIC identifier of the to-be-processed picture block is set to a second value. In this case, the determining at least one fourth information group based on the at least one third information group includes: determining that an LIC identifier in each of the at least one fourth information group is the second value. In other words, an LIC identifier in each of the at least one fourth information group is the second value.

Optionally, in some embodiments, a prediction direction in the second synthetic information group may be determined based on a prediction direction in the third selection information group and a prediction direction in the fourth selection information group.

Optionally, in some embodiments, if a prediction direction in the third synthetic information group is consistent with a prediction direction in the fourth synthetic information group, a prediction direction in the second synthetic information group is the same as the prediction direction in the third synthetic information group.

For example, if the prediction direction in the third synthetic information group is forward prediction, and the prediction direction in the fourth synthetic information group is forward prediction, the prediction direction in the second synthetic information group is forward prediction.

For another example, if the prediction direction in the third synthetic information group is backward prediction, and the prediction direction in the fourth synthetic information group is backward prediction, the prediction direction in the second synthetic information group is backward prediction.

For another example, if the prediction direction in the third synthetic information group is bidirectional prediction, and the prediction direction in the fourth synthetic information group is bidirectional prediction, the prediction direction in the second synthetic information group is bidirectional prediction.

Optionally, in some other embodiments, if a prediction direction in the third synthetic information group is different from a prediction direction in the fourth synthetic information group, the prediction direction in the second synthetic information group is the same as the prediction direction in the third synthetic information group.

For example, if the prediction direction in the third synthetic information group is forward prediction, and the prediction direction in the fourth synthetic information group is backward prediction, the prediction direction in the second synthetic information group is forward prediction.

For another example, if the prediction direction in the third synthetic information group is backward prediction, and the prediction direction in the fourth synthetic information group is forward prediction, the prediction direction in the second synthetic information group is backward prediction.

For another example, if the prediction direction in the third synthetic information group is bidirectional prediction, and the prediction direction in the fourth synthetic information group is forward prediction or backward prediction, the prediction direction in the second synthetic information group is bidirectional prediction.

Optionally, in some other embodiments, if a prediction direction in the third synthetic information group is different from a prediction direction in the fourth synthetic information group, the prediction direction in the second synthetic information group is the same as the prediction direction in the fourth synthetic information group.

For example, if the prediction direction in the third synthetic information group is forward prediction, and the prediction direction in the fourth synthetic information group is backward prediction, the prediction direction in the second synthetic information group is backward prediction.

For another example, if the prediction direction in the third synthetic information group is backward prediction, and the prediction direction in the fourth synthetic information group is forward prediction, the prediction direction in the second synthetic information group is forward prediction.

For another example, if the prediction direction in the third synthetic information group is bidirectional prediction, and the prediction direction in the fourth synthetic information group is forward prediction, the prediction direction in the second synthetic information group is forward prediction.

For another example, if the prediction direction in the third synthetic information group is bidirectional prediction, and the prediction direction in the fourth synthetic information group is backward prediction, the prediction direction in the second synthetic information group is backward prediction.

Optionally, in some other embodiments, if a prediction direction in the third synthetic information group is different from a prediction direction in the fourth synthetic information group, the prediction direction in the second synthetic information group is bidirectional prediction.

For example, if the prediction direction in the third synthetic information group is forward prediction, and the prediction direction in the fourth synthetic information group is backward prediction, the prediction direction in the second synthetic information group is bidirectional prediction.

For another example, if the prediction direction in the third synthetic information group is backward prediction, and the prediction direction in the fourth synthetic information group is forward prediction, the prediction direction in the second synthetic information group is bidirectional prediction.

For another example, if the prediction direction in the third synthetic information group is bidirectional prediction, and the prediction direction in the fourth synthetic information group is forward prediction or backward prediction, the prediction direction in the second synthetic information group is bidirectional prediction.

For another example, if the prediction direction in the third synthetic information group is forward prediction or backward prediction, and the prediction direction in the fourth synthetic information group is bidirectional prediction, the prediction direction in the second synthetic information group is bidirectional prediction.

A reference frame index in the second synthetic information group may be determined based on a reference frame index in the third selection information group and a reference frame index in the fourth selection information group.

For example, a forward reference frame index in the second synthetic information is a forward reference frame index in the third selection information group, and a backward reference frame index in the second synthetic information is a backward reference frame index in the fourth selection information group.

For another example, a forward reference frame index in the second synthetic information is a forward reference frame index in the fourth selection information group, and a backward reference frame index in the second synthetic information is a backward reference frame index in the third selection information group.

After the at least one fourth information group is determined, the at least one fourth information group may be inserted into the merge candidate list. For ease of description, in the following, it is assumed that a quantity of the at least one fourth information group is $N_3$. In addition, for ease of description, the third information group and the fourth information group in the candidate information list are collectively referred to as picture block information. After step 503 is performed, the merge candidate list includes a total of $N_2+N_3$ pieces of picture block information.

Optionally, in some embodiments, if one fourth information group determined based on two third information groups is the same as picture block information that already exists in the candidate information list, the fourth information group may be deleted, and a new fourth information group continues to be determined based on other third information groups.

504: Determine whether a sum of the quantity of the at least one third information group and a quantity of the at least one fourth information group is less than the target preset value. In other words, it is determined whether $N_2+N_3$ is less than $N_{max}$.

If $N_2+N_3$ is equal to $N_{max}$, the merge candidate list is a final merge candidate list.

If $N_2+N_3$ is less than $N_{max}$, step 505 is performed.

It may be understood that step 504 and step 503 may be performed at the same time. In other words, in the process of determining the at least one fourth information group, if the sum of the quantity of determined fourth information groups and the quantity of the at least one third information group is equal to the target preset value, the new fourth information group may not need to be further determined. The determined at least one fourth information group and the at least one information group constitute the final merge candidate list.

505: Determine at least one sixth information group, where each sixth information group may include an LIC identifier, a prediction direction, a reference frame index, and a motion vector, and the LIC identifier in each of the at least one sixth information group is the second value.

A sum of the quantity of the at least one third information group, the quantity of the at least one fourth information group, and a quantity of the at least one sixth information group is equal to the target preset value. Therefore, before the at least one sixth information group is determined, the quantity of the at least one sixth information group that needs to be determined may be further determined first. It is assumed that the quantity of the at least one sixth information group is $N_3$, and $N_1+N_2+N_3$ is equal to $N_{max}$.

An implementation of determining the at least one sixth information group is the same as an implementation of determining the at least one fifth information group in the embodiment shown in FIG. 3. Details are not described herein again.

After step 505 is performed, the determined at least one sixth information group may be inserted into the merge candidate list. In addition, for ease of description, the third information group, the fourth information group, and the sixth information group in the candidate information list are collectively referred to as picture block information. It can be learned that after step 505 is completed, a quantity of pieces of picture block information included in the merge candidate list is the target preset value. In this case, the merge candidate list is the final merge candidate list.

When the merge candidate list is constructed, the obtaining a predictor of the to-be-processed picture block based on the prediction information includes: obtaining the prediction value of the to-be-processed picture block based on the prediction information and the merge candidate list. In other words, the obtaining a prediction value of the to-be-processed picture block based on the prediction information includes: obtaining the prediction value of the to-be-processed picture block based on the prediction information, the at least one third information group, the at least one fourth information group, and the at least one sixth information group. A specific implementation of obtaining the prediction value of the to-be-processed picture block based on the prediction information and the merge candidate list is the same as an implementation in a conventional technology. Details are not described herein.

It can be learned that, a difference between the method for constructing a merge candidate list shown in FIG. 3 and the method for constructing a merge candidate list shown in FIG. 5 lies in how to determine the second/fourth information group based on the first/third information group. The method for determining the second information group shown in FIG. 3 may be referred to as a pairwise (PairWise) filling method. The method for determining the fourth information group shown in FIG. 5 may be referred to as a combination (Combination) filling method.

Optionally, in some embodiments, a destination device may determine, based on code version information in a bitstream, whether to construct a merge candidate list by using the method shown in FIG. 3 or the method shown in FIG. 5. Specifically, the bitstream may include the code version information. If the code version information is a versatile video coding test model (Versatile video coding Test Model, VTM) 3.0 or a version later than VTM 3.0, the merge candidate list is constructed by using the method shown in FIG. 3 (to be specific, picture block information that needs to be inserted into the merge candidate list is determined by using the pairwise filling method). If the code version information is information about another version (namely, a version other than the VTM 3.0 or other than a version later than the VTM 3.0), the merge candidate list is constructed by using the method shown in FIG. 5 (to be specific, picture block information that needs to be inserted into the merge candidate list is determined by using the combination filling method).

Figure 6:
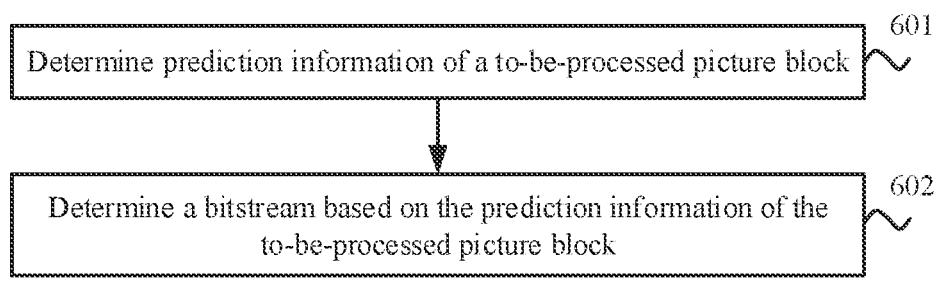
FIG. 6 is a schematic flowchart of an inter prediction method according to an embodiment of this application.

FIG. 6 is a schematic flowchart of an inter prediction method according to an embodiment of this application. The method shown in FIG. 6 may be performed by a source device.

601: Determine prediction information of a to-be-processed picture block.

The prediction information of the to-be-processed picture block may include a prediction mode of the to-be-processed picture block. It may be understood that because the embodiment shown in FIG. 6 is an embodiment of the inter prediction method, the prediction mode, determined by step 601, of the to-be-processed picture block in the prediction information of the to-be-processed picture block is inter prediction.

The prediction information of the to-be-processed picture block may further include a prediction direction of the to-be-processed picture block.

A specific process of determining the prediction information is the same as a process of determining prediction information in a conventional technology. Details are not described herein.

602: Determine a bitstream based on the prediction information of the to-be-processed picture block.

When the prediction information indicates that the prediction direction of the to-be-processed picture block is bidirectional prediction, the bitstream does not include target identification information, where the target identification information is used to indicate to perform LIC on the to-be-processed picture block. When the prediction information indicates that the prediction direction of the to-be-processed picture block is unidirectional prediction and the prediction mode is not a merge mode, the bitstream includes the target identification information.

Optionally, in some embodiments, the prediction indication may further indicate that the prediction mode is a merge mode. In this case, the source device may further construct a candidate motion information list. A specific implementation of constructing the candidate motion information list is the same as an implementation of constructing the merge candidate list. Therefore, reference may be made to the embodiments shown in FIG. 3 and FIG. 5.

The constructing a candidate motion information list may be performed before step 602. When the candidate motion information list is constructed, the determining a bitstream based on the prediction information of the to-be-processed picture block includes: determining the bitstream based on the prediction information of the to-be-processed picture block and the candidate motion information list.

Optionally, in some embodiments, after the candidate motion information list is constructed, optimal picture block information may be determined from the candidate motion information list, and an index value (referred to as an optimal index value for short hereinafter) of the optimal picture block information is transferred to a destination device. As described above, the destination device may construct the merge candidate list in the same manner. After the merge candidate list is constructed, the destination device may select one piece of picture block information from the merge candidate list based on the optimal index value.

Figure 7:
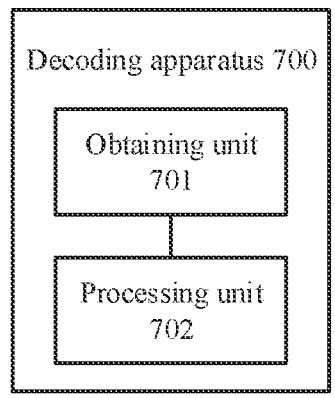
FIG. 7 is a schematic structural block diagram of a decoding apparatus according to an embodiment of this application.

FIG. 7 is a schematic structural block diagram of a decoding apparatus according to an embodiment of this application. The decoding apparatus shown in FIG. 7 may be a computer device, or may be a component (for example, a chip or a circuit) of a computer device.

As shown in FIG. 7, the decoding apparatus 700 may include an obtaining unit 701 and a processing unit 702. The obtaining unit 701 is configured to obtain a bitstream.

The processing unit 702 is configured to parse the bitstream to determine prediction information of a to-be-processed picture block. When the prediction information indicates that a prediction mode of to-be-processed picture block is inter prediction and that a prediction direction of the to-be-processed picture block is bidirectional prediction, the bitstream does not include target identification information, where the target identification information is used to indicate to perform local illumination compensation LIC on the to-be-processed picture block.

The processing unit 702 is further configured to obtain a prediction value of the to-be-processed picture block based on the prediction information.

The decoding apparatus shown in FIG. 7 can implement the steps of the methods shown in FIG. 2, FIG. 3, and FIG. 5. The obtaining unit 701 may be implemented by a receiver, and the processing unit 702 may be implemented by a processor. For specific functions and beneficial effects of the obtaining unit 701 and the processing unit 702, refer to the methods shown in FIG. 2, FIG. 3, and FIG. 5. Details are not described herein again.

Figure 8:
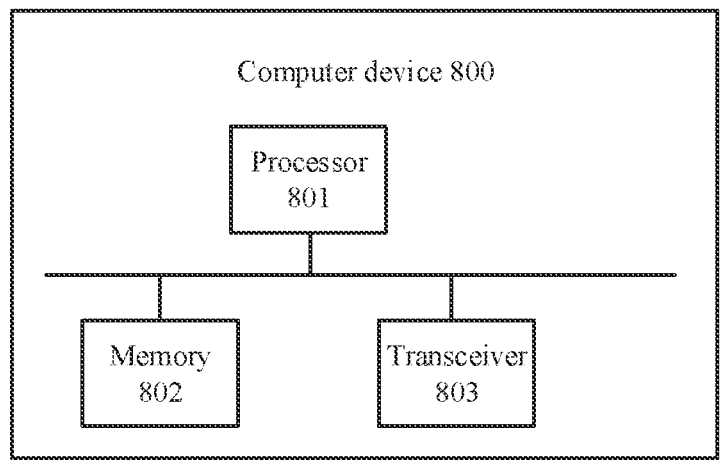
FIG. 8 is a structural block diagram of a computer device according to an embodiment of the present disclosure.

FIG. 8 is a structural block diagram of a computer device according to an embodiment of the present disclosure. As shown in FIG. 8, the computer device 800 includes a processor 801, a memory 802, and a transceiver 803. The processor 801 may be configured to control a computer device, execute a software program, process data of the software program, and the like. The memory 802 is mainly configured to store a software program and data. The transceiver 803 may be configured to communicate with another computer device. For example, if the computer device is a device (for example, a mobile terminal or a tablet computer) having a wireless communication function, the transceiver 803 may include a radio frequency circuit and an antenna. The radio frequency circuit is mainly configured to perform conversion between a baseband signal and a radio frequency signal, and process the radio frequency signal. The antenna is mainly configured to receive and send a radio frequency signal in a form of an electromagnetic wave. In addition to the processor, the memory, and the transceiver shown in FIG. 8, input and output apparatuses of the computer device, such as a touchscreen, a display screen, and a keyboard, are mainly configured to receive data input by a user and output a video, data, or the like to the user.

For ease of description, FIG. 8 shows only one memory and only one processor. An actual computer device product may include one or more processors and one or more memories. The memory may also be referred to as a storage medium, a storage device, or the like. The memory may be disposed independent of the processor, or may be integrated with the processor. This is not limited in this embodiment of this application.

In this embodiment of this application, a circuit having a transceiver function may be considered as the transceiver 803 of the computer device, and a processor having a processing function may be considered as a processing unit of the computer device. The transceiver may also be referred to as a transceiver unit, a transceiver machine, a transceiver apparatus, or the like. The processing unit may also be referred to as a processor, a processing board, a processing module, a processing apparatus, or the like. Optionally, a component that is in the transceiver 803 and that is configured to implement a receiving function may be considered as a receiving unit, and a component that is in the transceiver 803 and that is configured to implement a sending function may be considered as a sending unit. In other words, the transceiver 803 includes the receiving unit and the sending unit. The receiving unit sometimes may also be referred to as a receiver machine, a receiver, a receiver circuit, or the like. The sending unit sometimes may also be referred to as a transmitter machine, a transmitter, a transmitter circuit, or the like.

The processor 801, the memory 802, and the transceiver 803 communicate with each other through an internal connection path, to transfer a control and/or data signal.

The method disclosed in the foregoing embodiments of the present disclosure may be applied to the processor 801, or implemented by the processor 801. The processor 801 may be an integrated circuit chip, and has a signal processing capability. In an implementation process, the steps in the foregoing methods can be implemented by using a hardware integrated logic circuit in the processor 801, or by using instructions in a form of software.

The processor in the embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of the present disclosure. The general-purpose processor may be a microprocessor, may be any conventional processor, or the like. The steps of the methods disclosed with reference to the embodiments of the present disclosure may be directly performed by a hardware decoding processor, or may be performed by using a combination of hardware and software modules in a decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory, and the processor reads the instructions from the memory and completes the steps of the foregoing methods in combination with hardware in the processor.

Optionally, in some embodiments, the memory 802 may store instructions used to perform the method shown in FIG. 2. The processor 801 may complete, by executing the instructions stored in the memory 802 in combination with other hardware (for example, the transceiver 803), steps of the method shown in FIG. 2. For a specific working process and beneficial effects, refer to the descriptions in the embodiment shown in FIG. 2.

Optionally, in some embodiments, the memory 802 may store instructions used to perform the method shown in FIG. 3. The processor 801 may complete, by executing the instructions stored in the memory 802 in combination with other hardware (for example, the transceiver 803), steps of the method shown in FIG. 3. For a specific working process and beneficial effects, refer to the descriptions in the embodiment shown in FIG. 3.

Optionally, in some embodiments, the memory 802 may store instructions used to perform the method shown in FIG. 5. The processor 801 may complete, by executing the instructions stored in the memory 802 in combination with other hardware (for example, the transceiver 803), steps of the method shown in FIG. 5. For a specific working process and beneficial effects, refer to the descriptions in the embodiment shown in FIG. 5.

An embodiment of this application further provides a computer-readable storage medium. The computer-readable storage medium stores instructions. When the instructions are executed, the method on the decoder side in the foregoing method embodiment is performed.

An embodiment of this application further provides a computer program product including instructions. When the instructions are executed, the method on the decoder side in the foregoing method embodiment is performed.

Figure 9:
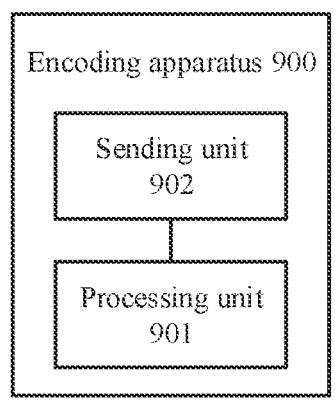
FIG. 9 is a schematic structural block diagram of an encoding apparatus according to an embodiment of this application.

FIG. 9 is a schematic structural block diagram of an encoding apparatus according to an embodiment of this application. The encoding apparatus shown in FIG. 9 may be a computer device, or may be a component (for example, a chip or a circuit) of a computer device.

As shown in FIG. 9, the encoding apparatus 900 may include a processing unit 901 and a sending unit 902.

The processing unit 901 is configured to determine prediction information of a to-be-processed picture block.

The processing unit 901 is further configured to determine a bitstream based on the prediction information of the to-be-processed picture block.

The sending unit 902 is configured to send the bitstream determined by the processing unit 901 to a decoding apparatus.

The encoding apparatus shown in FIG. 9 can implement the steps of the method shown in FIG. 6. The encoding apparatus shown in FIG. 9 may also implement, based on the method shown in FIG. 3 and/or FIG. 5, steps of constructing a candidate motion information list.

The processing unit 901 may be implemented by a processor, and the sending unit 902 may be implemented by a transmitter. For specific functions and beneficial effects of the processing unit 901 and the sending unit 902, refer to the methods shown in FIG. 6, FIG. 3, and FIG. 5. Details are not described herein again.

Figure 10:
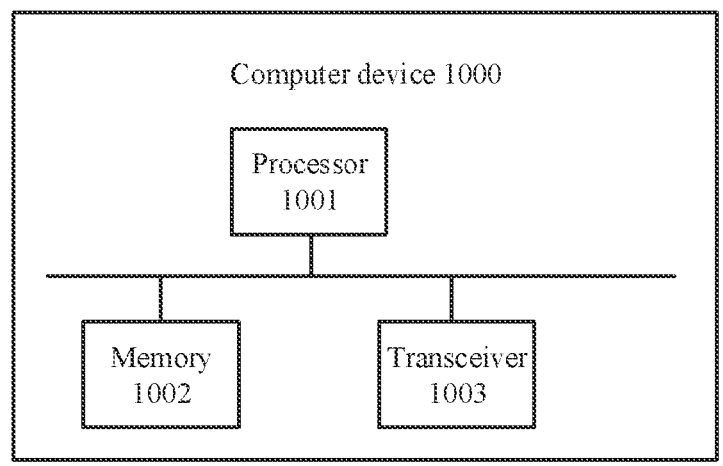
FIG. 10 is a structural block diagram of a computer device according to an embodiment of the present disclosure.

FIG. 10 is a structural block diagram of a computer device according to an embodiment of the present disclosure. As shown in FIG. 10, the computer device 1000 includes a processor 1001, a memory 1002, and a transceiver 1003. The processor 1001 may be configured to control a computer device, execute a software program, process data of the software program, and the like. The memory 1002 is mainly configured to store a software program and data. The transceiver 1003 may be configured to communicate with another computer device. For example, if the computer device is a device (for example, a mobile terminal or a tablet computer) having a wireless communication function, the transceiver 1003 may include a radio frequency circuit and an antenna. The radio frequency circuit is mainly configured to perform conversion between a baseband signal and a radio frequency signal, and process the radio frequency signal. The antenna is mainly configured to receive and send a radio frequency signal in a form of an electromagnetic wave. In addition to the processor, the memory, and the transceiver shown in FIG. 10, input and output apparatus of the computer device, such as a touchscreen, a display screen, and a keyboard, are mainly configured to receive data input by a user and output a video, data, or the like to the user.

For ease of description, FIG. 10 shows only one memory and one processor. An actual computer device product may include one or more processors and one or more memories. The memory may also be referred to as a storage medium, a storage device, or the like. The memory may be disposed independent of the processor, or may be integrated with the processor. This is not limited in this embodiment of this application.

In this embodiment of this application, a circuit having a transceiver function may be considered as the transceiver 1003 of the computer device, and a processor having a processing function may be considered as a processing unit of the terminal. The transceiver may also be referred to as a transceiver unit, a transceiver machine, a transceiver apparatus, or the like. The processing unit may also be referred to as a processor, a processing board, a processing module, a processing apparatus, or the like. Optionally, a component that is in the transceiver 1003 and that is configured to implement a receiving function may be considered as a receiving unit, and a component that is in the transceiver 1003 and that is configured to implement a sending function may be considered as a sending unit. In other words, the transceiver 1003 includes the receiving unit and the sending unit. The receiving unit sometimes may also be referred to as a receiver machine, a receiver, a receiver circuit, or the like. The sending unit sometimes may also be referred to as a transmitter machine, a transmitter, a transmitter circuit, or the like.

The processor 1001, the memory 1002, and the transceiver 1003 communicate with each other through an internal connection path, to transfer a control and/or data signal.

The method disclosed in the foregoing embodiments of the present disclosure may be applied to the processor 1001, or implemented by the processor 1001. The processor 1001 may be an integrated circuit chip, and has a signal processing capability. In an implementation process, the steps in the foregoing methods can be implemented by using a hardware integrated logic circuit in the processor 1001, or by using instructions in a form of software.

The processor in the embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of the present disclosure. The general-purpose processor may be a microprocessor, may be any conventional processor, or the like. The steps of the methods disclosed with reference to the embodiments of the present disclosure may be directly performed by a hardware decoding processor, or may be performed by using a combination of hardware and software modules in a decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory, and the processor reads the instructions from the memory and completes the steps of the foregoing methods in combination with hardware in the processor.

Optionally, in some embodiments, the memory 1002 may store instructions used to perform the method shown in FIG. 6. The processor 1001 may complete, by executing the instructions stored in the memory 1002 in combination with other hardware (for example, the transceiver 1003), steps of the method shown in FIG. 6. For a specific working process and beneficial effects, refer to the descriptions in the embodiment shown in FIG. 6.

Optionally, in some embodiments, the memory 1002 may store instructions used to perform the method shown in FIG. 3. The processor 1001 may complete, by executing the instructions stored in the memory 1002 in combination with other hardware (for example, the transceiver 1003), steps of the method shown in FIG. 3. For a specific working process and beneficial effects, refer to the descriptions in the embodiment shown in FIG. 3. It may be understood that the method shown in FIG. 3 is performed herein to construct a candidate motion information list based on the method shown in FIG. 3.

Optionally, in some embodiments, the memory 1002 may store instructions used to perform the method shown in FIG. 5. The processor 1001 may complete, by executing the instructions stored in the memory 1002 in combination with other hardware (for example, the transceiver 1003), steps of the method shown in FIG. 5. For a specific working process and beneficial effects, refer to the descriptions in the embodiment shown in FIG. 5. It may be understood that the method shown in FIG. 5 is performed herein to construct a candidate motion information list based on the method shown in FIG. 5.

An embodiment of this application further provides a computer-readable storage medium. The computer-readable storage medium stores instructions. When the instructions are executed, the method on the encoder side in the foregoing method embodiment is performed.

An embodiment of this application further provides a computer program product including instructions. When the instructions are executed, the method on the encoder side in the foregoing method embodiment is performed.

Figure 11:
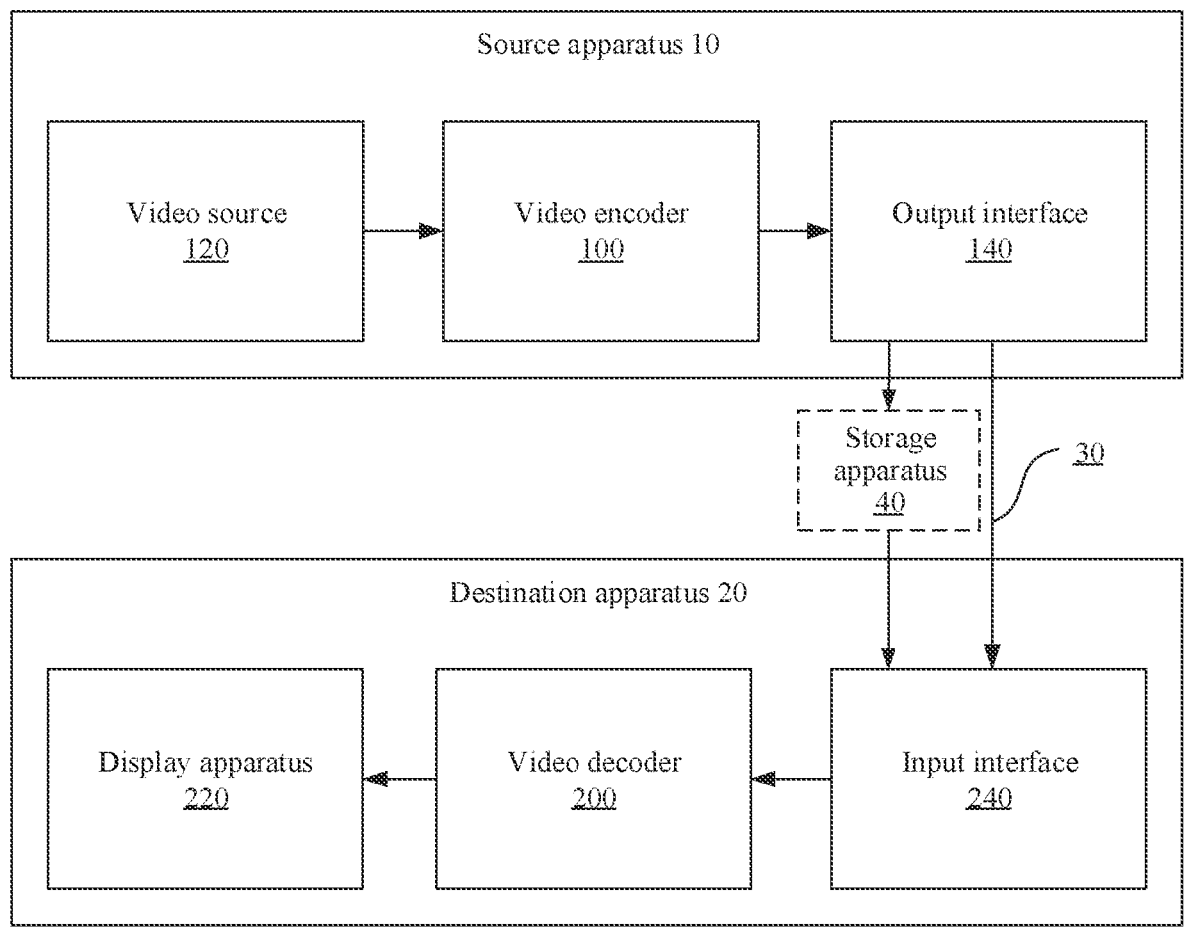
FIG. 11 is a block diagram of a video coding system according to an embodiment of the present disclosure.
Figure 12:
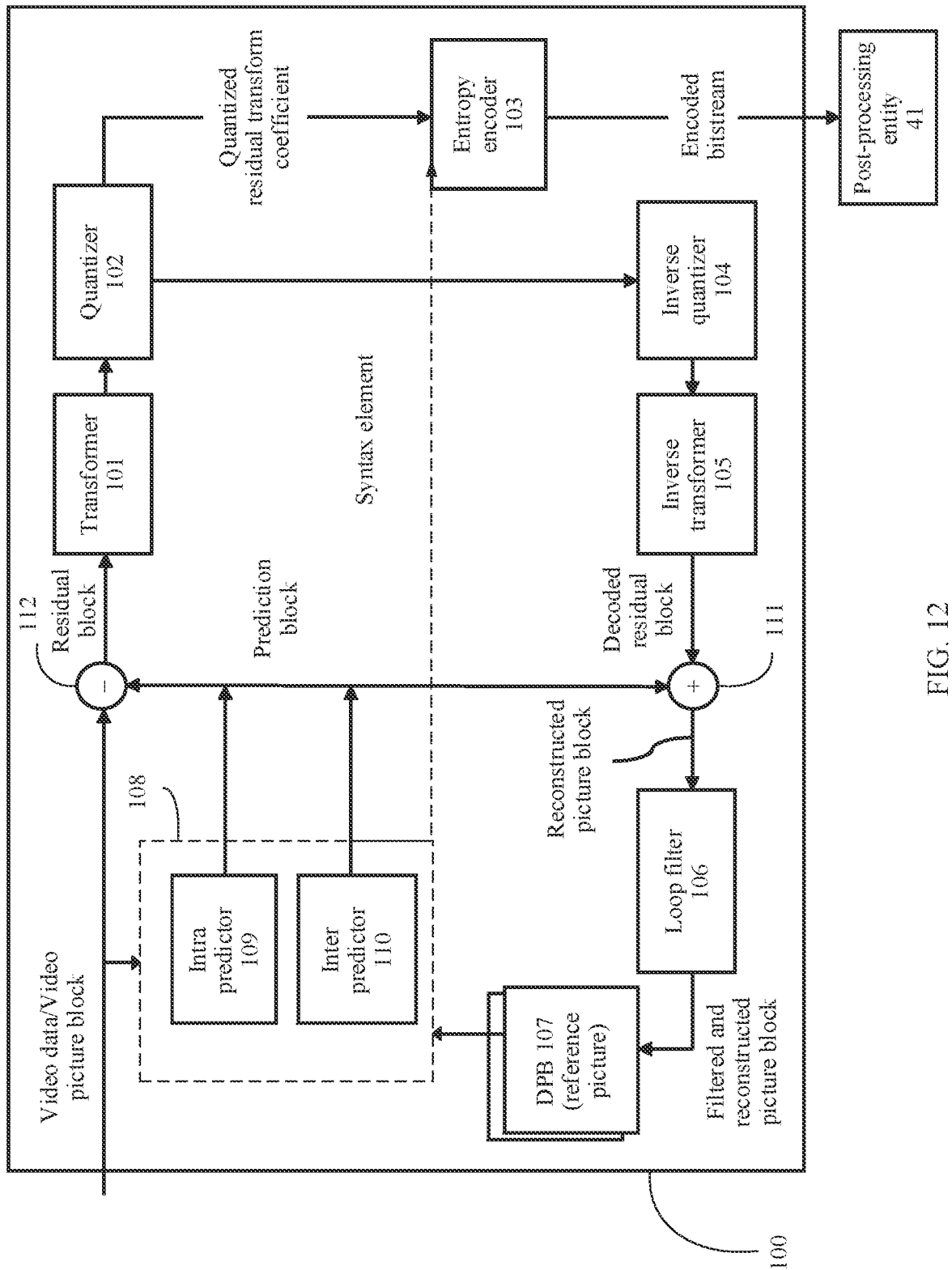
FIG. 12 is a system block diagram of a video encoder according to an embodiment of the present disclosure.
Figure 13:
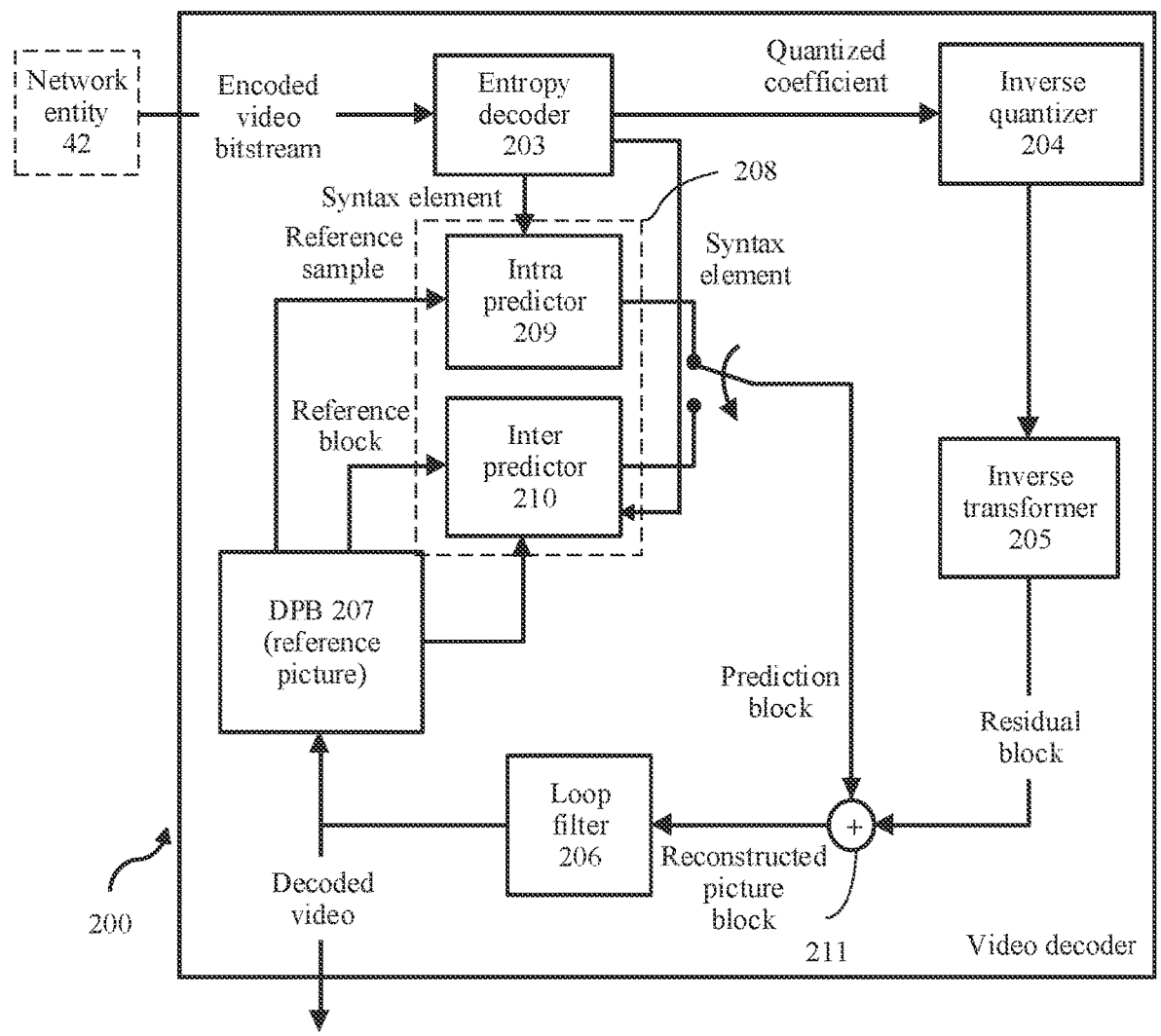
FIG. 13 is a system block diagram of a video decoder according to an embodiment of the present disclosure.

It should be understood that, for example, the embodiments of this application can be applied to a video coding system shown in FIG. 11 to FIG. 13.

FIG. 11 is a block diagram of an example video coding system according to an embodiment of this application. As used in this specification, the term "video codec" generally refers to a video encoder and a video decoder. In this application, the term "video coding" or "coding" may usually refer to video encoding or video decoding. A video encoder 100 and a video decoder 200 in the video coding system are configured to predict motion information, for example, a motion vector, of a current coded picture block or a subblock of the current coded picture block according to various method examples described in any one of a plurality of new inter prediction modes provided in this application, so that the predicted motion vector is maximally close to a motion vector obtained by using a motion estimation method. In this way, a motion vector difference does not need to be transmitted during encoding, thereby further improving coding performance.

As shown in FIG. 11, the video coding system includes a source apparatus 10 and a destination apparatus 20. The source apparatus 10 generates encoded video data. Therefore, the source apparatus 10 may be referred to as a video encoding apparatus. The destination apparatus 20 may decode the encoded video data generated by the source apparatus 10. Therefore, the destination apparatus 20 may be referred to as a video decoding apparatus. In various implementation solutions, the source apparatus 10, the destination apparatus 20, or both the source apparatus 10 and the destination apparatus 20 may include one or more processors and a memory coupled to the one or more processors. The memory may include but is not limited to a RAM, a ROM, an EEPROM, a flash memory, or any other medium that can be used to store desired program code in a form of instructions or data structures accessible by a computer, as described in this specification.

The source apparatus 10 and the destination apparatus 20 may include various apparatuses, including a desktop computer, a mobile computing apparatus, a notebook (for example, a laptop) computer, a tablet computer, a set-top box, a telephone handset such as a "smart" phone, a television set, a camera, a display apparatus, a digital media player, a video game console, an in-vehicle computer, and similar apparatuses.

The destination apparatus 20 may receive the encoded video data from the source apparatus 10 over a link 30. The link 30 may include one or more media or apparatuses that can transfer the encoded video data from the source apparatus 10 to the destination apparatus 20. In an example, the link 30 may include one or more communication media that enable the source apparatus 10 to directly transmit the encoded video data to the destination apparatus 20 in real time. In this example, the source apparatus 10 may modulate the encoded video data according to a communication standard (for example, a wireless communication protocol), and may transmit modulated video data to the destination apparatus 20. The one or more communication media may include a wireless communication medium and/or a wired communication medium, for example, a radio frequency (RF) spectrum or one or more physical transmission lines. The one or more communication media may constitute a part of a packet-based network, and the packet-based network is, for example, a local area network, a wide area network, or a global network (for example, the internet). The one or more communication media may include a router, a switch, a base station, or another device that facilitates communication from the source apparatus 10 to the destination apparatus 20.

In another example, the encoded data may be output to a storage apparatus 40 through an output interface 140. Similarly, the encoded data may be accessed from the storage apparatus 40 through an input interface 240. The storage apparatus 40 may include any one of a plurality of distributed data storage media or locally accessed data storage media, for example, a hard drive, a Blu-ray, a digital versatile disc (DVD), a compact disc read-only memory (CD-ROM), a flash memory, a volatile or nonvolatile memory, or any other appropriate digital storage medium configured to store the encoded video data.

In another example, the storage apparatus 40 may correspond to a file server or another intermediate storage apparatus that can maintain an encoded video generated by the source apparatus 10. The destination apparatus 20 may access the stored video data from the storage apparatus 40 through streaming transmission or downloading. The file server may be any type of server capable of storing the encoded video data and transmitting the encoded video data to the destination apparatus 20. In an example, the file server includes a network server (for example, used for a website), a file transfer protocol (FTP) server, a network attached storage (NAS) apparatus, or a local magnetic disk drive. The destination apparatus 20 may access the encoded video data through any standard data connection (including an internet connection). The standard data connection may include a wireless channel (for example, a Wireless-Fidelity (Wi-Fi) connection), a wired connection (for example, a digital subscriber line (DSL) or a cable modem), or a combination thereof that is suitable for accessing the encoded video data stored on the file server. Transmission of the encoded video data from the storage apparatus 40 may be streaming transmission, downloading transmission, or a combination thereof.

A motion vector prediction technology in this application may be used for video coding, to support a plurality of multimedia applications, for example, over-the-air television broadcast, cable television transmission, satellite television transmission, streaming video transmission (for example, over the internet), encoding of video data stored in a data storage medium, decoding of video data stored in a data storage medium, or other applications. In some examples, the video coding system may be configured to support unidirectional or bidirectional video transmission, to support applications such as streaming video transmission, video playback, video broadcasting, and/or videotelephony.

The video coding system described in FIG. 11 is merely an example, and the technology in this application is applicable to a video coding setting (for example, video encoding or video decoding) that does not necessarily include any data communication between an encoding apparatus and a decoding apparatus. In another example, data is retrieved from a local memory, is transmitted on a network in a streaming manner, and the like. The video encoding apparatus may encode data and store the data in the memory, and/or the video decoding apparatus may retrieve the data from the memory and decode the data. In many examples, apparatuses that only encode data and store the data in the memory and/or retrieve the data from the memory and decode the data and that do not communicate with each other perform encoding and decoding.

In the example in FIG. 11, the source apparatus 10 includes a video source 120, the video encoder 100, and the output interface 140. In some examples, the output interface 140 may include a modulator/demodulator (modem) and/or a transmitter. The video source 120 may include a video capturing apparatus (for example, a camera), a video archive including previously captured video data, a video feed-in interface for receiving video data from a video content provider, and/or a computer graphics system for generating video data, or a combination of the foregoing video data sources.

The video encoder 100 may encode video data that is from the video source 120. In some examples, the source apparatus 10 directly transmits the encoded video data to the destination apparatus 20 through the output interface 140. In another example, the encoded video data may alternatively be stored in the storage apparatus 40, so that the destination apparatus 20 subsequently accesses the encoded video data for decoding and/or playing.

In the example in FIG. 11, the destination apparatus 20 includes the input interface 240, the video decoder 200, and a display apparatus 220. In some examples, the input interface 240 includes a receiver and/or a modem. The input interface 240 may receive the encoded video data over the link 30 and/or from the storage apparatus 40. The display apparatus 220 may be integrated with the destination apparatus 20 or may be located outside the destination apparatus 20. Usually, the display apparatus 220 displays decoded video data. The display apparatus 220 may include a plurality of types of display apparatuses, for example, a liquid crystal display (liquid crystal display, LCD), a plasma display, an organic light-emitting diode (organic light-emitting diode, OLED) display, or another type of display apparatus.

Although not shown in FIG. 11, in some aspects, the video encoder 100 and the video decoder 200 may be integrated with an audio encoder and an audio decoder respectively, and may include an appropriate multiplexer-demultiplexer unit or other hardware and software, to encode an audio and a video in a combined data stream or separate data streams. In some examples, if applicable, a demultiplexer (MUX-DEMUX) unit may comply with the international telecommunication union (international telecommunication union, ITU) H.223 multiplexer protocol or another protocol such as the user datagram protocol (user datagram protocol, UDP).

For example, the video encoder 100 and the video decoder 200 each may be implemented as any one of a plurality of circuits: one or more microprocessors, a digital signal processing (digital signal processor, DSP), an application-specific integrated circuit (application-specific integrated circuit, ASIC), and a field-programmable gate array (field programmable gate array, FPGA), a discrete logic, hardware, or any combination thereof. If this application is implemented partially through software, the apparatus may store, in an appropriate nonvolatile computer-readable storage medium, instructions used for the software, and may use one or more processors to execute the instructions in hardware, to implement the technologies in this application. Any one of the foregoing content (including hardware, software, a combination of hardware and software, and the like) may be considered as one or more processors. The video encoder 100 and the video decoder 200 each may be included in one or more encoders or decoders, and the encoder or the decoder may be integrated as a part of a combined encoder/decoder (codec) in a corresponding apparatus.

In this application, the video encoder 100 may be usually referred to as another apparatus "signaling" or "transmitting" some information to, for example, the video decoder 200. The term "signaling" or "transmitting" may roughly refer to transfer of a syntax element and/or other data used to decode compressed video data. The transmission may occur in real time or almost in real time. Alternatively, the communication may occur after a period of time. For example, the communication may occur when a syntax element in an encoded bitstream is stored in a computer-readable storage medium during encoding, and the decoding apparatus may then retrieve the syntax element at any time after the syntax element is stored in the medium.

The JCT-VC develops the H.265 high efficiency video coding (high efficiency video coding, HEVC) standard. HEVC standardization is based on an evolved model of a video decoding apparatus, where the model is referred to as an HEVC test model (HEVC model, HM). A latest H.265 standard document is available at http://www.itu.int/rec/T-REC-H.265. A latest version of the standard document is H.265 (12/16), and the standard document is incorporated herein by reference in its entirety. In the HM, it is assumed that the video decoding apparatus has several additional capabilities relative to an existing algorithm of ITU-T H.264/AVC. For example, H.264 provides nine intra prediction coding modes, whereas the HM can provide up to 35 intra prediction coding modes.

JVET is committed to developing the H.266 standard. An H.266 standardization process is based on an evolved model of the video decoding apparatus, where the model is referred to as an H.266 test model. H.266 algorithm descriptions are available at http://phenix.int-evrv.fr/jvet, and latest algorithm descriptions are included in JVET-F1001-v2. A document of the algorithm descriptions is incorporated herein by reference in its entirety. In addition, reference software for a JEM test model is available at https://jvet.hhi.fraunhofer.de/svn/svn_HMJEMSoftware/, and is also incorporated herein by reference in its entirety.

Generally, in descriptions of an HM working model, a video frame or a picture may be split into sequences of tree blocks or largest coding units (LCU), where the tree blocks or the largest coding units include both luma samples and chroma samples, and the LCU is also referred to as a coding tree unit (CTU). A tree block has a function similar to that of a macroblock in the H.264 standard. A slice includes several consecutive tree blocks in a decoding order. The video frame or picture may be split into one or more slices. Each tree block may be split into coding units by using a quadtree split. For example, a tree block serving as a root node of a quadtree may be split into four child nodes, and each of the child nodes may become a parent node and be split into four other child nodes. A final non-splittable child node serving as a leaf node of the quadtree includes a decoding node, for example, a decoded video block. In syntax data associated with a decoded bitstream, a maximum quantity of times that the tree block can be split and a minimum size of the decoding node may be defined.

A coding unit includes a decoding node, a prediction block (PU), and a transform unit (TU) associated with the decoding node. A size of the CU corresponds to a size of the decoding node, and the CU needs to be in a square shape. The size of the CU may range from 8×8 pixels to a maximum of 64×64 pixels, or may be a larger tree block size. Each CU may include one or more PUs and one or more TUs. For example, syntax data associated with the CU may describe partitioning of the CU into one or more PUs. Partitioning patterns may vary in cases in which a CU is encoded in a skip mode, in a direct mode, in an intra prediction mode, and in an inter prediction mode. PUs obtained through partitioning may be in square shapes. For example, the syntax data associated with the CU may also describe partitioning of the CU into one or more TUs based on the quadtree. The TU may be in a square or non-square shape.

The HEVC standard allows TU-based transform, and different CUs may include different TUs. A size of a TU is usually set based on a size of a PU within a given CU defined for a partitioned LCU. However, a case may not always be like this. The size of the TU is usually the same as or less than that of the PU. In some feasible implementations, a quadtree structure referred to as a "residual quadtree" (RQT) may be used to partition a residual sample corresponding to the CU into smaller units. A leaf node of the RQT may be referred to as a TU. A pixel difference associated with the TU may be transformed to generate a transform coefficient, and the transform coefficient may be quantized.

Generally, a PU includes data related to a prediction process. For example, when the PU is encoded in an intra mode, the PU may include data describing the intra prediction mode of the PU. In another feasible implementation, when the PU is encoded in an inter mode, the PU may include data defining a motion vector for the PU. For example, the data defining the motion vector for the PU may describe a horizontal component of the motion vector, a vertical component of the motion vector, resolution (for example, ¼ pixel precision or ⅛ pixel precision) of the motion vector, a reference picture to which the motion vector points, and/or a reference picture list (for example, a list 0, a list 1, or a list C) of the motion vector.

Generally, transform and quantization processes are used for the TU. A given CU including one or more PUs may also include one or more TUs. After prediction, the video encoder 100 may calculate a residual value corresponding to the PU. The residual value includes a pixel difference. The pixel difference may be transformed into a transform coefficient, and the transform coefficient is quantized and is scanned by using a TU, to generate serialized transform coefficients for entropy decoding. In this application, the term "video block" is usually used to indicate a decoding node of a CU. In some specific applications, in this application, the term "video block" may also be used to indicate a tree block including a decoding node, a PU, and a TU, for example, the tree block is an LCU or a CU.

A video sequence usually includes a series of video frames or pictures. For example, a group of pictures (group of picture, GOP) includes a series of video pictures, or one or more video pictures. The GOP may include syntactic data in header information of the GOP, in header information of one or more of the pictures, or elsewhere. The syntactic data describes a quantity of pictures included in the GOP. Each slice of a picture may include slice syntactic data describing a coding mode of the corresponding picture. The video encoder 100 usually performs an operation on video blocks in some video slices, to encode the video data. The video block may correspond to the decoding node in the CU. A size of the video block may be fixed or changeable, and may vary with a specified decoding standard.

In a feasible implementation, the HM supports prediction for various PU sizes.

Assuming that a size of a given CU is 2N×2N, the HM supports intra prediction for a PU size of 2N×2N or N×N.

and inter prediction for a symmetric PU size of 2N×2N, 2N×N, N×2N, or N×N. The HM also supports asymmetric partitioning of inter prediction for PU sizes of 2N×nU, 2N×nD, nL×2N, and nR×2N. In asymmetric partitioning, the CU is not partitioned in a direction, and is partitioned into two parts in another direction, where one part accounts for 25% of the CU and the other part accounts for 75% of the CU. The part accounting for 25% of the CU is indicated by an indicator including "n" followed by "U (Up)", "D (Down)", "L (Left)", or "R (Right)". Therefore, for example, a CU partitioned in a mode of "2N×nU" refers to a horizontally partitioned 2N×2N CU, with a 2N×0.5N PU at the top and a 2N×1.5N PU at the bottom.

In this application, "N×N" and "N multiplied by N" may be used interchangeably to indicate a pixel size of a video block in a vertical dimension and a horizontal dimension, for example, 16×16 pixels or 16 multiplied by 16 pixels. Usually, a 16×16 block has 16 pixels in a vertical direction (y=16) and 16 pixels in a horizontal direction (x=16). Similarly, an N×N block usually has N pixels in a vertical direction and N pixels in a horizontal direction, where N is a nonnegative integer. Pixels in a block may be arranged in rows and columns. In addition, in a block, a quantity of pixels in the horizontal direction and a quantity of pixels in the vertical direction may not be necessarily the same. For example, a block may include N×M pixels, where M is not necessarily equal to N.

After intra predictive or inter predictive decoding of PUs in a CU, the video encoder 100 may calculate residual data of TUs in the CU. APU may include pixel data in a spatial domain (also referred to as a pixel domain). The TU may include a coefficient in a transform domain after transform (for example, discrete cosine transform (DCT), integer transform, wavelet transform, or conceptually similar transform) is applied to the residual video data. The residual data may correspond to a pixel difference between a pixel of an unencoded picture and a prediction value corresponding to the PU. The video encoder 100 may generate a TU including residual data of the CU, and then transform the TU to generate a transform coefficient of the CU.

After performing any transform to generate transform coefficients, the video encoder 100 may quantize the transform coefficients. Quantization refers to, for example, a process of quantizing the coefficients, to reduce an amount of data used for representing the coefficients and implement further compression. The quantization process can reduce a bit depth associated with some or all of the coefficients. For example, during quantization, an n-bit value may be reduced to an m-bit value through rounding, where n is greater than m.

The JEM model further improves a video picture coding structure. Specifically, a block coding structure referred to as a "quadtree plus binary tree" (QTBT) structure is introduced. Without using concepts such as CU, PU, and TU in HEVC, the QTBT structure supports more flexible CU partitioned shapes. A CU may be in a square shape or rectangular shape. Quadtree partitioning is first performed on a CTU, and then binary tree partitioning is performed on a leaf node of the quadtree. In addition, there are two binary tree partitioning modes: symmetric horizontal partitioning and symmetric vertical partitioning. A leaf node of a binary tree is referred to as a CU. The CU in the JEM model cannot be further partitioned during prediction and transform. In other words, the CU, the PU, and the TU in the JEM model have a same block size. In the existing JEM model, a maximum CTU size is 256×256 luma pixels.

In some feasible implementations, the video encoder 100 may scan the quantized transform coefficients in a predefined scanning order to generate a serialized vector that can be entropy encoded. In other feasible implementations, the video encoder 100 may perform adaptive scanning. After scanning the quantized transform coefficients to form a one-dimensional vector, the video encoder 100 may entropy decode the one-dimensional vector through context-based adaptive variable-length coding (CAVLC), context-based adaptive binary arithmetic coding (CABAC), syntax-based adaptive binary arithmetic coding (SBAC), probability interval partitioning entropy (PIPE) decoding, or another entropy decoding method. The video encoder 100 may further perform entropy coding on the syntax element associated with the encoded video data, to enable the video decoder 200 to decode the video data.

To perform CABAC, the video encoder 100 may assign a context in a context model to a to-be-transmitted symbol. The context may be related to whether an adjacent value of the symbol is non-zero. To perform CAVLC, the video encoder 100 may select a variable-length code of the to-be-transmitted symbol. A codeword in variable-length coding (VLC) may be constructed, so that a shorter codeword corresponds to a more probable symbol and a longer codeword corresponds to a less probable symbol. In this way, compared with using equal-length codewords for all to-be-transmitted symbols, using VLC can reduce a bit rate. A probability in CABAC may be determined based on the context assigned to the symbol.

In this embodiment of this application, the video encoder may perform inter prediction to reduce temporal redundancy between pictures. As described above, a CU may include one or more prediction units PUs depending on different video compression coding standards. In other words, a plurality of PUs may belong to one CU, or a PU and a CU have a same size. In this specification, when a CU and a PU have a same size, the CU is not partitioned, or the CU is partitioned into one PU, and the PU is uniformly used for description. When the video encoder performs inter prediction, the video encoder may signal motion information for the PU to the video decoder. For example, the motion information for the PU may include a reference picture index, a motion vector, and a prediction direction identifier. The motion vector may indicate a displacement between a picture block (also referred to as a video block, a pixel block, a pixel set, or the like) of the PU and a reference block of the PU. The reference block of the PU may be a part of a reference picture similar to the picture block of the PU. The reference block may be located in a reference picture indicated by the reference picture index and the prediction direction identifier.

To reduce a quantity of coded bits required to represent the motion information for the PU, the video encoder may generate a candidate predicted motion vector (Motion Vector, MV) list for each PU according to a merge prediction mode or an advanced motion vector prediction mode. Each candidate predicted motion vector in the candidate predicted motion vector list for the PU may indicate motion information. Motion information indicated by some candidate predicted motion vectors in the candidate predicted motion vector list may be based on motion information for other PUs. If a candidate predicted motion vector indicates motion information of one of a specified spatial candidate predicted motion vector position or a specified temporal candidate predicted motion vector position, the candidate predicted motion vector may be referred to as an "original" candidate predicted motion vector in this application. For example, in a merge mode, also referred to as a merge prediction mode in this specification, there may be five original spatial candidate predicted motion vector positions and one original temporal candidate predicted motion vector position. In some examples, the video encoder may generate additional candidate predicted motion vectors by combining some motion vectors from different original candidate predicted motion vectors, modifying the original candidate predicted motion vector, or inserting only a zero motion vector as the candidate predicted motion vector. The additional candidate predicted motion vectors are not considered as original candidate predicted motion vectors, and may be referred to as artificially generated candidate predicted motion vectors in this application.

The technologies in this application usually include a technology for generating a candidate predicted motion vector list on the video encoder and a technology for generating the same candidate predicted motion vector list on the video decoder. The video encoder and the video decoder may generate the same candidate predicted motion vector list by implementing a same technology for constructing the candidate predicted motion vector list. For example, the video encoder and the video decoder may construct lists with a same quantity of candidate predicted motion vectors (for example, five candidate predicted motion vectors). The video encoder and the video decoder may first consider spatial candidate predicted motion vectors (for example, adjacent blocks in a same picture) and then consider temporal candidate predicted motion vectors (for example, candidate predicted motion vectors in different pictures), and finally may consider artificially generated candidate predicted motion vectors, until a required quantity of candidate predicted motion vectors are added to the lists. According to the technologies in this application, during construction of the candidate predicted motion vector list, a pruning operation may be performed for some types of candidate predicted motion vectors to remove repeated candidate predicted motion vectors from the candidate predicted motion vector list, and may not be performed for other types of candidate predicted motion vectors to reduce decoder complexity. For example, for a set of spatial candidate predicted motion vectors and for a temporal candidate predicted motion vector, the pruning operation may be performed to remove a candidate predicted motion vector with repeated motion information from the candidate predicted motion vector list. However, an artificially generated candidate predicted motion vector may be added to the candidate predicted motion vector list when the pruning operation is not performed on the artificially generated candidate predicted motion vector.

After generating the candidate predicted motion vector list for the PU of the CU, the video encoder may select a candidate predicted motion vector from the candidate predicted motion vector list and output a candidate predicted motion vector index in a bitstream. The selected candidate predicted motion vector may be a candidate predicted motion vector for generating a motion vector that most closely matches a prediction value of a target PU that is being decoded. The candidate predicted motion vector index may indicate a position of the selected candidate predicted motion vector in the candidate predicted motion vector list. The video encoder may further generate a prediction picture block for the PU based on a reference block indicated by the motion information for the PU. The motion information for the PU may be determined based on motion information indicated by the selected candidate predicted motion vector. For example, in the merge mode, the motion information for the PU may be the same as the motion information indicated by the selected candidate predicted motion vector. In an AMVP mode, the motion information for the PU may be determined based on a motion vector difference for the PU and the motion information indicated by the selected candidate predicted motion vector. The video encoder may generate one or more residual picture blocks for the CU based on the prediction picture block for the PU of the CU and an original picture block for the CU. Then, the video encoder may encode the one or more residual picture blocks and output the one or more residual picture blocks in the bitstream.

The bitstream may include data identifying the selected candidate predicted motion vector in the candidate predicted motion vector list for the PU. The video decoder may determine the motion information for the PU based on the motion information indicated by the selected candidate predicted motion vector in the candidate predicted motion vector list for the PU. The video decoder may identify one or more reference blocks for the PU based on the motion information for the PU. After identifying the one or more reference blocks for the PU, the video decoder may generate the prediction picture block for the PU based on the one or more reference blocks for the PU. The video decoder may reconstruct the picture block for the CU based on the prediction picture block for the PU of the CU and the one or more residual picture blocks for the CU.

For ease of explanation, in this application, a position or a picture block may be described as having various spatial relationships with a CU or a PU. The description may be explained as follows: The position or the picture block has various spatial relationships with a picture block associated with the CU or the PU. In addition, in this application, a PU currently being decoded by the video decoder may be referred to as a current PU, or may be referred to as a current to-be-processed picture block. In this application, a CU currently being decoded by the video decoder may be referred to as a current CU. In this application, a picture currently being decoded by the video decoder may be referred to as a current picture. It should be understood that this application is also applicable in a case in which a PU and a CU have a same size, or a PU is a CU. The PU is uniformly used for description.

As described briefly above, the video encoder 100 may generate the prediction picture block and the motion information for the PU of the CU through inter prediction. In many examples, motion information for a given PU may be the same as or similar to motion information for one or more adjacent PUs (namely, a PU whose picture block is spatially or temporally adjacent to a picture block of the given PU). Because the adjacent PU often has similar motion information, the video encoder 100 may encode the motion information for the given PU based on the motion information for the adjacent PU. Encoding the motion information for the given PU based on the motion information for the adjacent PU can reduce a quantity of coded bits required in the bitstream for indicating the motion information for the given PU.

The video encoder 100 may encode the motion information for the given PU based on the motion information for the adjacent PU in various manners. For example, the video encoder 100 may indicate that the motion information for the given PU is the same as the motion information for the adjacent PU. In this application, the merge mode may be used to indicate that the motion information for the given PU is the same as the motion information for the adjacent PU or may be derived from the motion information for the adjacent PU. In another feasible implementation, the video encoder 100 may calculate a motion vector difference (Motion Vector Difference, MVD) for the given PU. The MVD indicates a difference between a motion vector of the given PU and a motion vector of the adjacent PU. The video encoder 100 may include the MVD instead of the motion vector for the given PU in the motion information for the given PU. In the bitstream, a quantity of coded bits required for representing the MVD is less than a quantity of coded bits required for representing the motion vector for the given PU. In this application, the advanced motion vector prediction mode may be used to indicate that the motion information for the given PU is signaled to a decoder side by using the MVD and an index value that is used for identifying a candidate motion vector.

To signal, in the merge mode or the AMVP mode, the motion information for the given PU to the decoder side, the video encoder 100 may generate a candidate predicted motion vector list for the given PU. The candidate predicted motion vector list may include one or more candidate predicted motion vectors. Each of the candidate predicted motion vectors in the candidate predicted motion vector list for the given PU may specify motion information. The motion information indicated by each candidate predicted motion vector may include a motion vector, a reference picture index, and a prediction direction identifier. The candidate predicted motion vectors in the candidate predicted motion vector list may include "original" candidate predicted motion vectors, and each "original" candidate predicted motion vector indicates motion information of one of specified candidate predicted motion vector positions within a PU different from the given PU.

After generating the candidate predicted motion vector list for the PU, the video encoder 100 may select one candidate predicted motion vector from the candidate predicted motion vector list for the PU. For example, the video encoder may compare each candidate predicted motion vector with a PU being decoded and may select a candidate predicted motion vector with a desired rate-distortion cost. The video encoder 100 may output a candidate predicted motion vector index for the PU. The candidate predicted motion vector index may identify a position of the selected candidate predicted motion vector in the candidate predicted motion vector list.

In addition, the video encoder 100 may generate a prediction picture block for the PU based on a reference block indicated by the motion information for the PU. The motion information for the PU may be determined based on motion information indicated by the selected candidate predicted motion vector in the candidate predicted motion vector list for the PU. For example, in the merge mode, the motion information for the PU may be the same as the motion information indicated by the selected candidate predicted motion vector. In the AMVP mode, the motion information for the PU may be determined based on the motion vector difference for the PU and the motion information indicated by the selected candidate predicted motion vector. As described above, the video encoder 100 may process the prediction picture block for the PU.

When the video decoder 200 receives the bitstream, the video decoder 200 may generate a candidate predicted motion vector list for each PU of the CU. The candidate predicted motion vector list generated by the video decoder 200 for the PU may be the same as the candidate predicted motion vector list generated by the video encoder 100 for the PU. A syntax element obtained by parsing the bitstream may indicate the position of the selected candidate predicted motion vector in the candidate predicted motion vector list for the PU. After generating the candidate predicted motion vector list for the PU, the video decoder 200 may generate the prediction picture block for the PU based on one or more reference blocks indicated by the motion information for the PU. The video decoder 200 may determine the motion information for the PU based on the motion information indicated by the selected candidate predicted motion vector in the candidate predicted motion vector list for the PU. The video decoder 200 may reconstruct the picture block for the CU based on the prediction picture block for the PU and the residual picture block for the CU.

It should be understood that, in a feasible implementation, on the decoder side, constructing the candidate predicted motion vector list and parsing of the bitstream to obtain the position of the selected candidate predicted motion vector in the candidate predicted motion vector list are independent of each other, and may be performed in any order or in parallel.

In another feasible implementation, on the decoder side, the position of the selected candidate predicted motion vector in the candidate predicted motion vector list is first obtained by parsing the bitstream, and then the candidate predicted motion vector list is constructed based on the position obtained through parsing. In this implementation, it is not necessary to construct all candidate predicted motion vector lists, and only a candidate predicted motion vector list in the position obtained through parsing needs to be constructed, to be specific, provided that the candidate predicted motion vector in the position can be determined. For example, when it is obtained, by parsing the bitstream, that the selected candidate predicted motion vector is a candidate predicted motion vector whose index is 3 in the candidate predicted motion vector list, only a candidate predicted motion vector list from an index 0 to the index 3 needs to be constructed, and the candidate predicted motion vector whose index is 3 can be determined. This can reduce complexity and improve decoding efficiency.

FIG. 12 is a block diagram of an example video encoder 100 according to an embodiment of this application. The video encoder 100 is configured to output a video to a post-processing entity 41. The post-processing entity 41 represents an example of a video entity capable of processing encoded video data that is from the video encoder 100. For example, the video entity is a media aware network element (MANE) or a stitching apparatus/an editing apparatus. In some cases, the post-processing entity 41 may be an example of a network entity. In some video encoding systems, the post-processing entity 41 and the video encoder 100 may be components of separate apparatuses. In another case, functions described with respect to the post-processing entity 41 may be implemented by a same apparatus including the video encoder 100. In an example, the post-processing entity 41 is an example of the storage apparatus 40 in FIG. 11.

In the example in FIG. 12, the video encoder 100 includes a prediction processing unit 108, a filter unit 106, a decoded picture buffer (decoded picture buffer, DPB) 107, a summator 112, a transformer 101, a quantizer 102, and an entropy encoder 103. The prediction processing unit 108 includes an inter prediction value 110 and an intra prediction value 109. For picture block reconstruction, the video encoder 100 further includes an inverse quantizer 104, an inverse transformer 105, and a summator 111. The filter unit 106 is intended to represent one or more loop filters, for example, a deblocking filter, an adaptive loop filter (ALF), and a sample adaptive offset (SAO) filter. Although the filter unit 106 is shown as an in-loop filter in FIG. 12, the filter unit 106 may be implemented as a post-loop filter in another implementation. In an example, the video encoder 100 may further include a video data memory and a partitioning unit (not depicted in the figure).

The video data memory may store video data encoded by a component of the video encoder 100. The video data stored in the video data memory may be obtained from a video source 120. The DPB 107 may be a reference picture memory that stores reference video data used by the video encoder 100 to encode the video data in an intra or inter coding mode. The video data memory and the DPB 107 may include any one of a plurality of types of memory apparatuses, for example, a dynamic random access memory (dynamic random access memory, DRAM) including a synchronous dynamic random access memory (synchronous dynamic random access memory, SDRAM), a magnetic RAM (magnetic random access memory, MRAM), a resistive RAM (resistive random access memory, RRAM), or another type of memory apparatus. The video data memory and the DPB 107 may be provided by a same memory apparatus or separate memory apparatuses. In various examples, the video data memory may be integrated onto a chip together with other components of the video encoder 100, or may be disposed outside the chip relative to those components.

As shown in FIG. 12, the video encoder 100 receives video data and stores the video data into the video data memory. The partitioning unit partitions the video data into several picture blocks, and these picture blocks may be further partitioned into smaller blocks, for example, partitioned based on a quadtree structure or a binary-tree structure. The partitioning may further include partitioning into slices (slice), tiles (tile), or other larger units. The video encoder 100 is usually a component for encoding a picture block in a to-be-encoded video slice. The slice may be partitioned into a plurality of picture blocks (and may be partitioned into picture block sets that are referred to as tiles). The prediction processing unit 108 may select one of a plurality of possible coding modes used for a current picture block, for example, one of a plurality of intra coding modes or one of a plurality of inter coding modes. The prediction processing unit 108 may provide obtained intra-coded/decoded and inter-coded/decoded blocks to the summator 112 to generate a residual block, and provide the blocks to the summator 111 to reconstruct an encoded block used as a reference picture.

The intra prediction value 109 in the prediction processing unit 108 may perform intra predictive encoding on a to-be-encoded current block relative to one or more neighboring blocks that are in a same frame or slice as the current picture block, to remove spatial redundancy. The inter prediction value 110 in the prediction processing unit 108 may perform inter predictive encoding on the current picture block relative to one or more prediction blocks in one or more reference pictures, to remove temporal redundancy.

Specifically, the inter prediction value 110 may be configured to determine an inter prediction mode used to encode the current picture block. For example, the inter prediction value 110 may calculate, through rate-distortion analysis, rate-distortion values of various inter prediction modes in a candidate inter prediction mode set, and select an inter prediction mode with an optimal rate-distortion feature from the inter prediction modes. Rate-distortion analysis is usually used to determine an amount of distortion (or error) between an encoded block and an original block that has not been encoded and that is to be encoded to generate the encoded block, and a bit rate (namely, a quantity of bits) used to generate the encoded block. For example, the inter prediction value 110 may determine, in the candidate inter prediction mode set, an inter prediction mode that has a minimum rate-distortion cost and that is used to encode the current picture block, as the inter prediction mode used to perform inter prediction on the current picture block.

The inter prediction value 110 is configured to predict the motion information (for example, a motion vector) of the one or more subblocks in the current picture block based on the determined inter prediction mode, and obtain or generate a prediction block of the current picture block by using the motion information (for example, the motion vector) of the one or more subblocks in the current picture block. The inter prediction value 110 may locate, in one reference picture in a reference picture list, the prediction block to which the motion vector points. The inter prediction value 110 may further generate a syntax element associated with a picture block and a video slice, so that the video decoder 200 uses the syntax element to decode the picture block of the video slice. Alternatively, in an example, the inter prediction value 110 performs a motion compensation process by using motion information of each subblock, to generate a prediction block of the subblock, thereby obtaining the prediction block of the current picture block. It should be understood that the inter prediction value 110 herein performs a motion estimation process and the motion compensation process.

Specifically, after selecting the inter prediction mode for the current picture block, the inter prediction value 110 may provide, to the entropy encoder 103, information indicating the selected inter prediction mode of the current picture block, so that the entropy encoder 103 encodes the information indicating the selected inter prediction mode.

The intra prediction value 109 may perform intra prediction on the current picture block. Specifically, the intra prediction value 109 may determine an intra prediction mode used to encode the current block. For example, the intra prediction value 109 may calculate bit rate-distortion values for various to-be-tested intra prediction modes through bit rate-distortion analysis, and select an intra prediction mode with an optimal bit rate-distortion characteristic from the to-be-tested modes. In any case, after selecting the intra prediction mode for the picture block, the intra prediction value 109 may provide, to the entropy encoder 103, information indicating the selected intra prediction mode of the current picture block, so that the entropy encoder 103 encodes the information indicating the selected intra prediction mode.

After the prediction processing unit 108 generates the prediction block of the current picture block through inter prediction and intra prediction, the video encoder 100 subtracts the prediction block from the current to-be-encoded picture block to form a residual picture block. The summator 112 represents one or more components that perform the subtraction operation. Residual video data in the residual block may be included in one or more TUs, and applied to the transformer 101. The transformer 101 transforms the residual video data into a residual transform coefficient through transform such as discrete cosine transform (DCT) or conceptually similar transform. The transformer 101 may convert the residual video data from a pixel value domain to a transform domain, for example, a frequency domain.

The transformer 101 may send the obtained transform coefficient to the quantizer 102. The quantizer 102 quantizes the transform coefficient to further reduce the bit rate. In some examples, the quantizer 102 may further scan a matrix including a quantized transform coefficient. Alternatively, the entropy encoder 103 may perform scanning.

After quantization, the entropy encoder 103 performs entropy encoding on the quantized transform coefficient. For example, the entropy encoder 103 may perform context-adaptive variable-length coding (CAVLC), context-adaptive binary arithmetic coding (CABAC), syntax-based context-adaptive binary arithmetic coding (SBAC), probability interval partitioning entropy (PIPE) coding, or another entropy encoding method or technology. After the entropy encoder 103 performs entropy encoding, an encoded bitstream may be transmitted to the video decoder 200, or archived for subsequent transmission or to be retrieved by the video decoder 200. The entropy encoder 103 may further perform entropy encoding on a syntax element of the to-be-encoded current picture block.

The inverse quantizer 104 and the inverse transformer 105 respectively apply inverse quantization and inverse transform, to reconstruct the residual block in a pixel domain, for example, to be subsequently used as a reference block of the reference picture. The summator 111 adds a reconstructed residual block to the prediction block generated by the inter prediction value 110 or the intra prediction value 109, to generate a reconstructed picture block. The filter unit 106 is applicable to the reconstructed picture block to reduce distortion such as blocking artifacts (block artifacts). Then, the reconstructed picture block is stored as the reference block in the decoded picture buffer 107, and may be used by the inter prediction value 110 as the reference block to perform inter prediction on a block in a subsequent video frame or picture.

It should be understood that another structural variant of the video encoder 100 may be used to encode a video stream. For example, for some picture blocks or picture frames, the video encoder 100 may directly quantize a residual signal, and correspondingly, processing performed by the transformer 101 and the inverse transformer 105 is not required. Alternatively, for some picture blocks or picture frames, the video encoder 100 does not generate residual data, and correspondingly, processing by the transformer 101, the quantizer 102, the inverse quantizer 104, and the inverse transformer 105 is not required. Alternatively, the video encoder 100 may directly store the reconstructed picture block as the reference block, without processing by the filter unit 106. Alternatively, the quantizer 102 and the inverse quantizer 104 in the video encoder 100 may be combined.

FIG. 13 is a block diagram of an example video decoder 200 according to an embodiment of this application. In the example in FIG. 13, the video decoder 200 includes an entropy decoder 203, a prediction processing unit 208, an inverse quantizer 204, an inverse transformer 205, a summator 211, a filter unit 206, and a DPB 207. The prediction processing unit 208 may include an inter prediction value 210 and an intra prediction value 209. In some examples, the video decoder 200 may perform a decoding process that is substantially inverse to the encoding process described with respect to the video encoder 100 in FIG. 12.

During decoding, the video decoder 200 receives, from the video encoder 100, an encoded video bitstream that represents a picture block of an encoded video slice and an associated syntax element. The video decoder 200 may receive video data from a network entity 42, and optionally, may further store the video data in a video data memory (not depicted in the figure). The video data memory may store video data that is to be decoded by a component of the video decoder 200, for example, the encoded video bitstream. The video data stored in the video data memory may be obtained from, for example, a local video source such as the storage apparatus 40 or a camera through wired or wireless network communication of the video data, or by accessing a physical data storage medium. The video data memory may be used as a decoded picture buffer (DPB) configured to store encoded video data that is from the encoded video bitstream. Therefore, although the video data memory is not shown in FIG. 13, the video data memory and the DPB 207 may be a same memory, or may be memories that are separately disposed. The video data memory and the DPB 207 each may include any one of a plurality of types of memory apparatuses, for example, a dynamic random access memory (DRAM) including a synchronous DRAM (SDRAM), a magnetic RAM (MRAM), a resistive RAM (RRAM), or another type of memory apparatus. In various examples, the video data memory may be integrated onto a chip together with other components of the video decoder 200, or may be disposed outside the chip relative to those components.

The network entity 42 may be, for example, a server, a MANE, a video editor/clipper, or another apparatus configured to implement one or more of the technologies described above. The network entity 42 may or may not include a video encoder, for example, the video encoder 100. Before the network entity 42 sends the encoded video bitstream to the video decoder 200, the network entity 42 may implement a part of the technology described in this application. In some video decoding systems, the network entity 42 and the video decoder 200 may be components of separate apparatuses. In another case, functions described with respect to the network entity 42 may be implemented by a same apparatus including the video decoder 200. In some cases, the network entity 42 may be an example of the storage apparatus 40 in FIG. 11.

The entropy decoder 203 of the video decoder 200 performs entropy decoding on the bitstream to generate a quantized coefficient and some syntax elements. The entropy decoder 203 forwards the syntax elements to the prediction processing unit 208. The video decoder 200 may receive syntax elements/a syntax element at a video slice level and/or a picture block level.

When the video slice is decoded into an intra-decoded (I) slice, the intra prediction value 209 of the prediction processing unit 208 may generate a prediction block of the picture block of the current video slice based on a signaled intra prediction mode and data of a previously decoded block of a current frame or picture. When the video slice is decoded into an inter-decoded (in other words, B or P) slice, the inter prediction value 210 of the prediction processing unit 208 may determine, based on the syntax element received from the entropy decoder 203, an inter prediction mode used to decode a current picture block of the current video slice, and decode (for example, perform inter prediction on) the current picture block based on the determined inter prediction mode. Specifically, the inter prediction value 210 may determine whether to use a new inter prediction mode to predict the current picture block of the current video slice. If the syntax element indicates to use the new inter prediction mode to predict the current picture block, the inter prediction value 210 predicts motion information of the current picture block of the current video slice or motion information of a subblock of the current picture block based on the new inter prediction mode (for example, a new inter prediction mode indicated by the syntax element or a default new inter prediction mode), to obtain or generate a prediction block for the current picture block or the subblock of the current picture block based on the predicted motion information of the current picture block or the predicted motion information of the subblock of the current picture block by using a motion compensation process. The motion information herein may include reference picture information and a motion vector. The reference picture information may include but is not limited to unidirectional/bidirectional prediction information, a reference picture list number, and a reference picture index corresponding to a reference picture list. For inter prediction, the prediction block may be generated from one of reference pictures in one of reference picture lists. The video decoder 200 may construct reference picture lists, namely, a list 0 and a list 1, based on reference pictures stored in the DPB 207. A reference frame index of the current picture may be included in one of or both a reference frame list 0 and a reference frame list 1. In some examples, the video encoder 100 may signal to indicate whether to decode a specific syntax element of a specific block by using the new inter prediction mode, or may signal to indicate whether to use the new inter prediction mode and indicate which new inter prediction mode is specifically used to decode a specific syntax element of a specific block. It should be understood that the inter prediction value 210 herein performs the motion compensation process.

The inverse quantizer 204 performs inverse quantization on, in other words, dequantizes, a quantized transform coefficient provided in the bitstream and decoded by the entropy decoder 203. An inverse quantization process may include: determining a to-be-applied quantization degree by using a quantization parameter calculated by the video encoder 100 for each picture block in the video slice, and similarly determining a to-be-applied inverse quantization degree. The inverse transformer 205 applies inverse transform, for example, inverse DCT, inverse integer transform, or a conceptually similar inverse transform process, to the transform coefficient, to generate a pixel-domain residual block.

After the inter prediction value 210 generates the prediction block used for the current picture block or the subblock of the current picture block, the video decoder 200 summates the residual block from the inverse transformer 205 and the corresponding prediction block generated by the inter prediction value 210, to obtain a reconstructed block, in other words, a decoded picture block. The summator 211 represents a component that performs the summation operation. When necessary, a loop filter (in or after a decoding loop) may be further used to smoothen pixels, or video quality may be improved in another manner. The filter unit 206 may represent one or more loop filters, for example, a deblocking filter, an adaptive loop filter (ALF), and a sample adaptive offset (SAO) filter. Although the filter unit 206 is shown as an in-loop filter in FIG. 13, the filter unit 206 may be implemented as a post-loop filter in another implementation. In an example, the filter unit 206 is applicable to block reconstruction to reduce block distortion, and this result is output as a decoded video stream. In addition, a decoded picture block in a specified frame or picture may be stored in the DPB 207, and the DPB 207 stores a reference picture used for subsequent motion compensation. The DPB 207 may be a component of the memory, and may further store a decoded video for subsequent presentation on a display apparatus (for example, the display apparatus 220 in FIG. 11); or may be separated from such type of memory.

It should be understood that another structural variant of the video decoder 200 may be used to decode the encoded video bitstream. For example, the video decoder 200 may generate an output video stream, without processing by the filter unit 206. Alternatively, for some picture blocks or picture frames, the entropy decoder 203 of the video decoder 200 does not obtain a quantized coefficient through decoding, and correspondingly, processing by the inverse quantizer 204 and the inverse transformer 205 is not required.

As described above, the technologies in this application relate to, for example, inter decoding. It should be understood that the technologies in this application may be performed by any video decoder described in this application, and the video decoder includes (for example) the video encoder 100 and the video decoder 200 shown and described in FIG. 11 to FIG. 13. In other words, in a feasible implementation, the inter prediction value 110 described with reference to FIG. 12 may perform, when performing inter prediction during encoding on a block of video data, a particular technology described below. In another feasible implementation, the inter prediction value 210 described with reference to FIG. 13 may perform, when performing inter prediction during decoding on a block of video data, a particular technology described below. Therefore, a reference to a general "video encoder" or "video decoder" may include the video encoder 100, the video decoder 200, or another video encoding unit or decoding unit.

It should be understood that on the encoder 100 and the decoder 200 in this application, a processing result for a procedure may be output to a next procedure after being further processed. For example, after a procedure such as interpolation filtering, motion vector derivation, or loop filtering, an operation such as clip or shift is further performed on a processing result of a corresponding procedure.

For example, a value of the motion vector is constrained to be within a specific bit width range. Assuming that an allowed bit width of the motion vector is bitDepth, the value of the motion vector ranges from $-2^{\wedge}(\text{bitDepth}-1)$ to $2^{\wedge}(\text{bitDepth}-1)-1$, where the symbol "^" represents exponentiation. If bitDepth is 16, the value ranges from −32768 to 32767. If bitDepth is 18, the value ranges from −131072 to 131071. The value of the motion vector may be constrained in either of the following two manners:

Manner 1: An overflow most significant bit of the motion vector is removed.

$$ux=(vx+2^{bitDepth})\%2^{bitDepth}$$

$$vx=(ux>=2^{bitDepth-1})?(u-2^{bitDepth}):ux$$

$$uy=(vy+2^{bitDepth})\%2^{bitDepth}$$

$$vy=(uv>=2^{bitDepth-1})?(uy-2^{bitDepth}):uy$$

For example, a value of vx is −32769, and 32767 is derived according to the foregoing formulas. A value is stored on a computer in a two's complement representation, a two's complement representation of −32769 is 1,0111, 1111,1111,1111 (17 bits), and processing performed by the computer for overflowing is discarding a most significant bit. Therefore, a value of vx is 0111,1111,1111,1111, that is, 32767. This value is consistent with the result derived through processing according to the formulas.

Manner 2: Clipping is performed on the motion vector, and the following formulas are used:

$$vx=\text{Clip3}(-2^{bitDepth-1},2^{bitDepth-1}-1,vx)$$

$$vy=\text{Clip3}(-2^{bitDepth-1},2^{bitDepth-1}-1,vy)$$

In the foregoing formulas, clip3 is defined as clipping a value of z to a range [x, y].

$$\text{Clip3}(x, y, z) = \begin{cases} x & ; & z < x \\ y & ; & z > y \\ z & ; & \text{otherwise} \end{cases}$$

The inter prediction module 121, for example, may include a motion estimation unit and a motion compensation unit. A relationship between a PU and a CU vanes with a video compression coding standard. The inter prediction module 121 may partition a current CU into PUs according to a plurality of partitioning patterns. For example, the inter prediction module 121 may partition the current CU into the PUs according to 2N×2N, 2N×N, N×2N, and N×N partitioning patterns. In another embodiment, the current CU is a current PU. This is not limited.

The inter prediction module 121 may perform integer motion estimation (IME) and then fraction motion estimation (FME) on each PU. When the inter prediction module 121 performs IME on the PU, the inter prediction module 121 may search one or more reference pictures for a reference block for the PU. After finding the reference block for the PU, the inter prediction module 121 may generate a motion vector that indicates, with integer precision, a spatial displacement between the PU and the reference block for the PU. When the inter prediction module 121 performs FME on the PU, the inter prediction module 121 may improve the motion vector generated by performing IME on the PU. The motion vector generated by performing FME on the PU may have sub-integer precision (for example, ½ sample precision or ¼ sample precision). After generating the motion vector for the PU, the inter prediction module 121 may generate a prediction picture block for the PU by using the motion vector for the PU.

In some feasible implementations in which the inter prediction module 121 signals motion information for the PU to a decoder side in an AMVP mode, the inter prediction module 121 may generate a candidate predicted motion vector list for the PU. The candidate predicted motion vector list may include one or more original candidate predicted motion vectors and one or more additional candidate predicted motion vectors derived from the one or more original candidate predicted motion vectors. After generating the candidate predicted motion vector list for the PU, the inter prediction module 121 may select a candidate predicted motion vector from the candidate predicted motion vector list and generate a motion vector difference (MVD) for the PU. The MVD for the PU may indicate a difference between a motion vector indicated by the selected candidate predicted motion vector and the motion vector generated for the PU through IME and FME. In these feasible implementations, the inter prediction module 121 may output a candidate predicted motion vector index identifying a position of the selected candidate predicted motion vector in the candidate predicted motion vector list. The inter prediction module 121 may further output the MVD for the PU.

In addition to performing IME and FME on the PU to generate the motion information for the PU, the inter prediction module 121 may further perform a merge (Merge) operation on the PU. When the inter prediction module 121 performs the merge operation on the PU, the inter prediction module 121 may generate a candidate predicted motion vector list for the PU. The candidate predicted motion vector list for the PU may include one or more original candidate predicted motion vectors and one or more additional candidate predicted motion vectors derived from the one or more original candidate predicted motion vectors. The original candidate predicted motion vectors in the candidate predicted motion vector list may include one or more spatial candidate predicted motion vectors and temporal candidate predicted motion vectors. The spatial candidate predicted motion vector may indicate motion information for another PU in a current picture. The temporal candidate predicted motion vector may be based on motion information for a corresponding PU in a picture different from the current picture. The temporal candidate predicted motion vector may also be referred to as temporal motion vector prediction (TMVP).

After generating the candidate predicted motion vector list, the inter prediction module 121 may select one candidate predicted motion vector from the candidate predicted motion vector list. Then, the inter prediction module 121 may generate a prediction picture block for the PU based on the reference block indicated by the motion information for the PU. In the merge mode, the motion information for the PU may be the same as motion information indicated by the selected candidate predicted motion vector.

After generating the prediction picture block for the PU through IME and FME and generating the prediction picture block for the PU through the merge operation, the inter prediction module 121 may select the prediction picture block generated by performing the FME operation or the prediction picture block generated by performing the merge operation. In some feasible implementations, the inter prediction module 121 may select the prediction picture block for the PU by analyzing rate-distortion costs of the prediction picture block generated by performing the FME operation and the prediction picture block generated by performing the merge operation.

After the inter prediction module 121 has selected a prediction picture block of a PU generated by partitioning the current CU according to each partitioning pattern (in some implementations, after a coding tree unit CTU is partitioned into CUs, the CU is not further partitioned into smaller PUs, and in this case, the PU is equivalent to the CU), the inter prediction module 121 may select a partitioning pattern for the current CU. In some implementations, the inter prediction module 121 may select the partitioning pattern for the current CU by analyzing a rate-distortion cost of the selected prediction picture block of the PU generated by partitioning the current CU according to each partitioning pattern. The inter prediction module 121 may output a prediction picture block associated with a PU that belongs to the selected partitioning pattern to a residual generation module 102. The inter prediction module 121 may output a syntax element of motion information for the PU that belongs to the selected partitioning pattern to an entropy encoding module.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that, the disclosed system, apparatus, and method may be implemented in another manner. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the method described in the embodiments of this application. The storage medium includes any medium that can store program code such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An inter prediction method, wherein the method comprises:
    parsing a bitstream to determine prediction information of a to-be-processed picture block, wherein when the prediction information indicates that a prediction direction of the to-be-processed picture block is bidirectional prediction, the bitstream does not comprise target identification information, and wherein the target identification information indicates to perform local illumination compensation (LIC) on the to-be-processed picture block;
    obtaining a prediction value of the to-be-processed picture block based on the prediction information;
    parsing a second bitstream to determine second prediction information of a second to-be-processed picture block, wherein when the second prediction information indicates that a prediction direction of the second to-be-processed picture block is unidirectional prediction, the second bitstream comprises second target identification information, and wherein the second target identification information indicates to perform the LIC on the second to-be-processed picture block; and
    obtaining a prediction value of the second to-be-processed picture block based on the second prediction information.

2. The method according to claim 1, wherein in response to the prediction information of the to-be-processed picture block indicating that a prediction mode of the to-be-processed picture block is a merge mode, before obtaining the prediction value of the to-be-processed picture block based on the prediction information, the method further comprises:
    determining at least one first information group, wherein each first information group comprises a motion vector, a prediction direction, and an LIC identifier; and
    in response to a quantity of the at least one first information group being less than a target preset value, determining at least one second information group based on the at least one first information group, wherein each second information group comprises a motion vector, a prediction direction, and an LIC identifier, and wherein
    obtaining the prediction value of the to-be-processed picture block based on the prediction information comprises:
    obtaining the prediction value of the to-be-processed picture block based on the prediction information, the at least one first information group, and the at least one second information group.

3. The method according to claim 2, wherein the at least one first information group comprises a first selection information group and a second selection information group, the at least one second information group comprises a first synthetic information group, and determining the at least one second information group based on the at least one first information group comprises:
    using an average value of a motion vector in the first selection information group and a motion vector in the second selection information group as a motion vector in the first synthetic information group.

4. The method according to claim 2, wherein the prediction direction comprises either the bidirectional prediction or the unidirectional prediction, the unidirectional prediction comprises first-directional prediction and second-directional prediction, the at least one first information group comprises a first selection information group and a second selection information group, the at least one second information group comprises a first synthetic information group, and determining the at least one second information group based on the at least one first information group comprises:
    determining a prediction direction in the first synthetic information group based on a prediction direction in the first selection information group and a prediction direction in the second selection information group.

5. The method according to claim 4, wherein in response to the LIC being performed on the to-be-processed picture block, an LIC identifier of the to-be-processed picture block is a first value, or in response to the LIC not being performed on the to-be-processed picture block, an LIC identifier of the to-be-processed picture block is a second value, and wherein
    determining the at least one second information group based on the at least one first information group comprises one of:
    in response to the prediction direction in the first synthetic information group being the bidirectional prediction, determining that an LIC identifier in the first synthetic information group is the second value;
    in response to the prediction direction in the first synthetic information group being the unidirectional prediction, and an LIC identifier in the first selection information group and an LIC identifier in the second selection information group each being the second value, determining that an LIC identifier in the first synthetic information group is the second value; or in response to the prediction direction in the first synthetic information group being the unidirectional prediction, and at least one of an LIC identifier in the first selection information group or an LIC identifier in the second selection information group being the first value, determining that an LIC identifier in the first synthetic information group is the first value.

6. The method according to claim 1, wherein in response to the prediction information of the to-be-processed picture block indicating that a prediction mode of the to-be-processed picture block is a merge mode, before obtaining the prediction value of the to-be-processed picture block based on the prediction information, the method further comprises:

determining at least one third information group, wherein each third information group comprises a motion vector and an LIC identifier; and in response to a quantity of the at least one third information group being less than a target preset value, determining at least one fourth information group based on the at least one third information group, wherein each fourth information group comprises a motion vector and an LIC identifier, and wherein obtaining the prediction value of the to-be-processed picture block based on the prediction information comprises:

obtaining the prediction value of the to-be-processed picture block based on the prediction information, the at least one third information group, and the at least one fourth information group.

7. The method according to claim 6, wherein the prediction direction comprises either the bidirectional prediction or the unidirectional prediction, the unidirectional prediction comprises first-directional prediction and second-directional prediction, the at least one third information group comprises a third selection information group and a fourth selection information group, the at least one fourth information group comprises a second synthetic information group, and determining the at least one fourth information group based on the at least one third information group comprises:

using a motion vector that is of the first-directional prediction and that corresponds to the third selection information group as a motion vector that is of the first-directional prediction and that corresponds to the second synthetic information group, and using a motion vector that is of the second-directional prediction and that corresponds to the fourth selection information group as a motion vector that is of the second-directional prediction and that corresponds to the second synthetic information group; or using a motion vector that is of the second-directional prediction and that corresponds to the third selection information group as a motion vector that is of the first-directional prediction and that corresponds to the second synthetic information group, and using a motion vector that is of the first-directional prediction and that corresponds to the fourth selection information group as a motion vector that is of the second-directional prediction and that corresponds to the second synthetic information group.

8. The method according to claim 6, wherein in response to the LIC being performed on the to-be-processed picture block, an LIC identifier of the to-be-processed picture block is a first value, or in response to the LIC not being performed on the to-be-processed picture block, an LIC identifier of the to-be-processed picture block is a second value, and wherein determining the at least one fourth information group based on the at least one third information group comprises: determining that an LIC identifier in each of the at least one fourth information group is the second value.

9. The method according to claim 5, wherein the at least one first information group comprises a fifth selection information group, and determining the at least one first information group comprises:

determining a target picture block in a reconstructed picture frame temporarily adjacent to a picture frame in which the to-be-processed picture block is located;

determining a prediction direction in the fifth selection information group based on the target picture block; and in response to the prediction direction in the fifth selection information group being the bidirectional prediction, determining that an LIC identifier in the fifth selection information group is the second value.

10. The method according to claim 5, wherein in response to a sum of the quantity of the at least one first information group and a quantity of the at least one second information group being less than the target preset value, before obtaining the prediction value of the to-be-processed picture block based on the prediction information, the method further comprises:

determining at least one fifth information group, wherein an LIC identifier in the fifth information group is the second value, and a sum of the quantity of the at least one first information group, the quantity of the at least one second information group, and a quantity of the at least one fifth information group is equal to the target preset value, and wherein obtaining the prediction value of the to-be-processed picture block based on the prediction information comprises:

obtaining the prediction value of the to-be-processed picture block based on the prediction information, the at least one first information group, the at least one second information group, and the at least one fifth information group.

11. The method according to claim 8, wherein in response to a sum of a quantity of the at least one third information group and a quantity of the at least one fourth information group being less than the target preset value, before obtaining the prediction value of the to-be-processed picture block based on the prediction information, the method further comprises:

determining at least one sixth information group, wherein an LIC identifier in the sixth information group is the second value, and a sum of the quantity of the at least one third information group, the quantity of the at least one fourth information group, and a quantity of the at least one sixth information group is equal to the target preset value, and wherein obtaining the prediction value of the to-be-processed picture block based on the prediction information comprises:

obtaining the prediction value of the to-be-processed picture block based on the prediction information, the at least one third information group, the at least one fourth information group, and the at least one sixth information group.

12. A decoding apparatus, comprising:
at least one processor;
a non-transitory computer-readable storage medium coupled to the at least one processor and storing programming instructions for execution by the at least one processor, wherein the programming instructions instruct the at least one processor to:
obtain a bitstream;
parse the bitstream to determine prediction information of a to-be-processed picture block, wherein when the prediction information indicates that a prediction mode of the to-be-processed picture block is inter prediction and a prediction direction of the to-be-processed picture block is bidirectional prediction, the bitstream does not comprise target identification information, and wherein the target identification information indicates to perform local illumination compensation (LIC) on the to-be-processed picture block;
obtain a prediction value of the to-be-processed picture block based on the prediction information;
obtain a second bitstream;
parse the second bitstream to determine second prediction information of a second to-be-processed picture block, wherein when the second prediction information indicates that a prediction direction of the second to-be-processed picture block is unidirectional prediction, the second bitstream comprises second target identification information, and wherein the second target identification information indicates to perform the LIC on the second to-be-processed picture block; and
obtain a prediction value of the second to-be-processed picture block based on the second prediction information.

13. The decoding apparatus according to claim 12, wherein the programming instructions further instruct the at least one processor to:
in response to the prediction information of the to-be-processed picture block indicating that the prediction mode of the to-be-processed picture block is a merge mode, determine at least one first information group, wherein each first information group comprises a motion vector, a prediction direction, and an LIC identifier;
in response to a quantity of the at least one first information group being less than a target preset value, determine at least one second information group based on the at least one first information group, wherein each second information group comprises a motion vector, a prediction direction, and an LIC identifier; and
obtain the prediction value of the to-be-processed picture block based on the prediction information, the at least one first information group, and the at least one second information group.

14. The decoding apparatus according to claim 13, wherein the at least one first information group comprises a first selection information group and a second selection information group, the at least one second information group comprises a first synthetic information group, and the programming instructions further instruct the at least one processor to:
use an average value of a motion vector in the first selection information group and a motion vector in the second selection information group as a motion vector in the first synthetic information group.

15. The decoding apparatus according to claim 13, wherein the prediction direction comprises either the bidirectional prediction or the unidirectional prediction, the unidirectional prediction comprises first-directional prediction and second-directional prediction, the at least one first information group comprises a first selection information group and a second selection information group, the at least one second information group comprises a first synthetic information group, and the programming instructions further instruct the at least one processor to:
determine a prediction direction in the first synthetic information group based on a prediction direction in the first selection information group and a prediction direction in the second selection information group.

16. The decoding apparatus according to claim 15, wherein in response to the LIC being performed on the to-be-processed picture block, an LIC identifier of the to-be-processed picture block is a first value, or in response to the LIC not being performed on the to-be-processed picture block, an LIC identifier of the to-be-processed picture block is a second value, and wherein the programming instructions further instruct the at least one processor to:
in response to determining that the prediction direction in the first synthetic information group is the bidirectional prediction, determine that an LIC identifier in the first synthetic information group is the second value;
in response to determining that the prediction direction in the first synthetic information group is the unidirectional prediction, and an LIC identifier in the first selection information group and an LIC identifier in the second selection information group each are the second value, determine that an LIC identifier in the first synthetic information group is the second value; or
in response to determining that the prediction direction in the first synthetic information group is the unidirectional prediction, and at least one of an LIC identifier in the first selection information group or an LIC identifier in the second selection information group is the first value, determine that an LIC identifier in the first synthetic information group is the first value.

17. The decoding apparatus according to claim 12, wherein in response to the prediction information of the to-be-processed picture block indicating that the prediction mode of the to-be-processed picture block is a merge mode, the programming instructions further instruct the at least one processor to:
determine at least one third information group, wherein each third information group comprises a motion vector and an LIC identifier;
in response to a quantity of the at least one third information group being less than a target preset value, determine at least one fourth information group based on the at least one third information group, wherein each fourth information group comprises a motion vector and an LIC identifier; and
obtain the prediction value of the to-be-processed picture block based on the prediction information, the at least one third information group, and the at least one fourth information group.

18. The decoding apparatus according to claim 17, wherein the prediction direction comprises either the bidirectional prediction or the unidirectional prediction, the unidirectional prediction comprises first-directional prediction and second-directional prediction, the at least one third information group comprises a third selection information group and a fourth selection information group, the at least one fourth information group comprises a second synthetic information group, and the programming instructions further instruct the at least one processor to:
- use a motion vector that is of the first-directional prediction and that corresponds to the third selection information group as a motion vector that is of the first-directional prediction and that corresponds to the second synthetic information group, and use a motion vector that is of the second-directional prediction and that corresponds to the fourth selection information group as a motion vector that is of the second-directional prediction and that corresponds to the second synthetic information group; or
- use a motion vector that is of the second-directional prediction and that corresponds to the third selection information group as a motion vector that is of the first-directional prediction and that corresponds to the second synthetic information group, and use a motion vector that is of the first-directional prediction and that corresponds to the fourth selection information group as a motion vector that is of the second-directional prediction and that corresponds to the second synthetic information group.

19. The decoding apparatus according to claim 17, wherein in response to the LIC being performed on the to-be-processed picture block, an LIC identifier of the to-be-processed picture block is a first value, or in response to the LIC not being performed on the to-be-processed picture block, an LIC identifier of the to-be-processed picture block is a second value, and the programming instructions further instruct the at least one processor to:
- determine that an LIC identifier in each of the at least one fourth information group is the second value.

20. The decoding apparatus according to claim 16, wherein the at least one first information group comprises a fifth selection information group, and the programming instructions further instruct the at least one processor to:
- determine a target picture block in a reconstructed picture frame temporarily adjacent to a picture frame in which the to-be-processed picture block is located;
- determine a prediction direction in the fifth selection information group based on the target picture block; and
- in response to the prediction direction in the fifth selection information group being the bidirectional prediction, determine that an LIC identifier in the fifth selection information group is the second value.

* * * * *